(12) United States Patent
Liang

(10) Patent No.: US 12,347,445 B2
(45) Date of Patent: Jul. 1, 2025

(54) AUDIO CODING AND DECODING METHOD AND APPARATUS, MEDIUM, AND ELECTRONIC DEVICE

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 672 days.

(21) Appl. No.: 17/740,304

(22) Filed: May 9, 2022

(65) Prior Publication Data

US 2022/0270623 A1    Aug. 25, 2022

Related U.S. Application Data

(63) Continuation of application No. PCT/CN2021/095022, filed on May 21, 2021.

(30) Foreign Application Priority Data

Jun. 24, 2020 (CN) .......................... 202010592469.4

(51) Int. Cl.
*G10L 19/00* (2013.01)
*G06N 3/08* (2023.01)
(Continued)

(52) U.S. Cl.
CPC ............ *G10L 19/0204* (2013.01); *G06N 3/08* (2013.01); *G10L 25/18* (2013.01); *G10L 25/30* (2013.01); *G10L 25/51* (2013.01)

(58) Field of Classification Search
CPC ....... G10L 21/038; G10L 19/00; G10L 19/24; G10L 19/02; G10L 19/0204;
(Continued)

(56) References Cited

U.S. PATENT DOCUMENTS 10,832,696 B2 * 11/2020 Liang ...................... G10L 25/51
10,841,432 B2 * 11/2020 Liang ...................... H04R 3/04
(Continued)

FOREIGN PATENT DOCUMENTS

| CN | 101188111 A | 5/2008 |
|----|-------------|--------|
| CN | 101436406 A | 5/2009 |

(Continued)

OTHER PUBLICATIONS

L. Chuanhai, H. Ruimin, H. Bo and C. Sheng, "Research on audio bandwidth extension codec," 2013 3rd International Conference on Consumer Electronics, Communications and Networks, Xianning, China, 2013, pp. 537-541. (Year: 2013).*

(Continued)

*Primary Examiner* — Edgar X Guerra-Erazo
(74) *Attorney, Agent, or Firm* — Morgan, Lewis & Bockius LLP

(57) ABSTRACT

An electronic device performs sub-band decomposition on a to-be-coded audio to obtain a to-be-coded low frequency signal corresponding to a low frequency band and a to-be-coded high frequency signal corresponding to a high frequency band. The device performs compression coding on the to-be-coded low frequency signal to obtain low frequency coded data of the to-be-coded low frequency signal. The device determines high frequency prediction information according to the to-be-coded low frequency signal. The device performs feature extraction on the to-be-coded high frequency signal to obtain high frequency feature information. The device determines high frequency compensation information of the to-be-coded high frequency signal according to a difference between the high frequency feature information and the high frequency prediction information. The device also performs encapsulation processing on the low frequency coded data and the high frequency compen- (Continued)

sation information to obtain audio coded data of the to-be-coded audio.

20 Claims, 10 Drawing Sheets

(51) Int. Cl.
*G10L 19/02* (2013.01)
*G10L 25/18* (2013.01)
*G10L 25/30* (2013.01)
*G10L 25/51* (2013.01)

(58) Field of Classification Search
CPC ... G10L 19/0208; G10L 19/032; G10L 19/04;
G10L 19/087; G10L 19/08; G10L 19/12;
G10L 19/16; G10L 19/167; G10L 19/265;
G10L 19/26; G10L 25/30; G10L 25/27;
G10L 25/03; G10L 25/06; G10L 25/15;
G10L 25/21; G10L 25/18; G06N 3/08;
G06N 3/02; G06N 3/044; G06N 3/0442;
G06N 3/0455; G06N 3/045; G06N
3/0464; G06N 3/0475; G06N 3/048;
G06N 3/09; G06N 3/094; G06N 3/096;
G06N 20/10; G06N 20/20; G06N 20/00
See application file for complete search history.

(56) References Cited

U.S. PATENT DOCUMENTS

| 11,605,394 B2* | 3/2023 | Liang ............... G10L 25/90 |
| 2008/0126102 A1 | 5/2008 | Shirakawa et al. |
| 2010/0198588 A1* | 8/2010 | Sudo ............... G10L 21/038 704/205 |

FOREIGN PATENT DOCUMENTS

| CN | 103714822 A | 4/2014 |
| CN | 103928029 A | 7/2014 |
| CN | 105070293 A | 11/2015 |
| CN | 106847297 A | 6/2017 |
| CN | 112767954 A | 5/2021 |
| JP | 2007017908 A | 1/2007 |
| KR | 20130007521 A | 1/2013 |
| WO | WO 0060575 A1 | 10/2000 |

OTHER PUBLICATIONS

L. Jiang, R. Hu, X. Wang, W. Tu and M. Zhang, "Nonlinear prediction with deep recurrent neural networks for non-blind audio bandwidth extension," in China Communications, vol. 15, No. 1, pp. 72-85, Jan. 2018. (Year: 2018).*
H. Liu, C. Bao, X. Liu, X. Zhang and L. Zhang, "Audio bandwidth extension based on RBF neural network," 2011 IEEE International Symposium on Signal Processing and Information Technology (ISSPIT), Bilbao, Spain, 2011, pp. 150-154. (Year: 2011).*
K. Schmidt and B. Edler, "Blind Bandwidth Extension of Speech based on LPCNet," 2020 28th European Signal Processing Conference (EUSIPCO), Amsterdam, Netherlands, 2021, pp. 426-430. (Year: 2021).*
J. Lin, W. Min, Y. Shengyu, G. Ying and X. Mangan, "Adaptive Bandwidth Extension of Low Bitrate Compressed Audio Based on Spectral Correlation," 2015 8th International Conference on Intelligent Computation Technology and Automation (ICICTA), Nanchang, China, 2015, pp. 113-117 (Year: 2015).*
Li, Kehuang, and Chin-Hui Lee. "A deep neural network approach to speech bandwidth expansion." 2015 IEEE international conference on acoustics, speech and signal processing (ICASSP). IEEE, 2015. (Year: 2015).*
Tencent Technology, ISR, PCT/CN2021/095022, Jul. 29, 2021, 2 pgs.
Tencent Technology, WO, PCT/CN2021/095022, Jul. 29, 2021, 5 pgs.
Tencent Technology, IPRP, PCT/CN2021/095022, Dec. 13, 2022, 6 pgs.

* cited by examiner

AUDIO CODING AND DECODING METHOD AND APPARATUS, MEDIUM, AND ELECTRONIC DEVICE

CROSS-REFERENCED TO RELATED APPLICATIONS

This application is a continuation application of PCT Patent Application No. PCT/CN2021/095022, entitled "AUDIO ENCODING/DECODING METHOD AND APPARATUS. MEDIUM, AND ELECTRONIC DEVICE" filed on May 21, 2021, which claims priority to Chinese Patent Application No. 202010592469.4, filed with the State Intellectual Property Office of the People's Republic of China on Jun. 24, 2020, and entitled "AUDIO CODING AND DECODING METHOD AND APPARATUS, MEDIUM, AND ELECTRONIC DEVICE", all of which are incorporated herein by reference in their entirety.

FIELD OF THE TECHNOLOGY

This application relates to the field of artificial intelligence technologies, and specifically, to an audio coding and decoding technology.

BACKGROUND OF THE DISCLOSURE

Audio coding and decoding plays an important role in modern communication systems. By performing compression coding processing on audio data, network bandwidth pressure of audio data in network transmission can be reduced, and storage costs and transmission costs of audio data can be reduced.

Audio data such as music and voice are mainly located on a low frequency band, and an amplitude of a high frequency band is very small. If coding is performed on an entire frequency band, to protect high frequency band data, low frequency band data coding may be excessively fine, which causes a large quantity of coded file data, and it is difficult to obtain an ideal compression coding effect. If a high frequency band data component is discarded because a main component of low frequency band data is stored, audio quality is lost, which causes serious distortion of the audio after decoding. Therefore, how to ensure, as far as possible, accurate transmission of high frequency band data in an audio data coding and decoding process is an urgent problem to be solved at present.

SUMMARY

This application aims to provide an audio coding method, an audio decoding method, an audio coding apparatus, an audio decoding apparatus, a computer readable medium, and an electronic device, so as to at least overcome, to a certain extent, a technical problem such as component loss of high frequency band audio data and poor transmission accuracy that exist in an audio coding and decoding technology.

According to an aspect of an embodiment of this application, an audio coding method is provided. The method includes: performing sub-band decomposition on a to-be-coded audio to obtain a to-be-coded low frequency signal corresponding to a low frequency band and a to-be-coded high frequency signal corresponding to a high frequency band; performing compression coding on the to-be-coded low frequency signal to obtain low frequency coded data of the to-be-coded low frequency signal; determining high frequency prediction information according to the to-be-coded low frequency signal based on a correlation between a low frequency signal and a high frequency signal; performing feature extraction on the to-be-coded high frequency signal to obtain high frequency feature information of the to-be-coded high frequency signal, and determining high frequency compensation information of the to-be-coded high frequency signal according to a difference between the high frequency feature information and the high frequency prediction information; and performing encapsulation processing on the low frequency coded data and the high frequency compensation information to obtain audio coded data of the to-be-coded audio.

According to an aspect of an embodiment of this application, an audio coding apparatus is provided, where the apparatus includes: an audio decomposition module, configured to perform sub-band decomposition on a to-be-coded audio to obtain a to-be-coded low frequency signal corresponding to a low frequency band and a to-be-coded high frequency signal corresponding to a high frequency band; a low frequency coding module, configured to perform compression coding on the to-be-coded low frequency signal to obtain low frequency coded data of the to-be-coded low frequency signal; a high frequency prediction module, configured to determine high frequency prediction information according to the to-be-coded low frequency signal based on correlation between a low frequency signal and a high frequency signal; a high frequency compensation module, configured to perform feature extraction on the to-be-coded high frequency signal to obtain high frequency feature information of the to-be-coded high frequency signal, and determine high frequency compensation information of the to-be-coded high frequency signal according to a difference between the high frequency feature information and the high frequency prediction information; and a coding encapsulation module, configured to perform encapsulation processing on the low frequency coded data and the high frequency compensation information to obtain audio coded data of the to-be-coded audio.

According to an aspect of an embodiment of this application, an audio decoding method is provided, where the method includes: performing encapsulation parsing on to-be-decoded audio coded data to obtain low frequency coded data and high frequency compensation information in the audio coded data; performing decoding processing on the low frequency coded data to obtain a restored low frequency signal; determining high frequency prediction information according to the restored low frequency signal based on correlation between a low frequency signal and a high frequency signal; performing gain compensation on the high frequency prediction information according to the high frequency compensation information to obtain high frequency feature information, and performing feature restoration on the high frequency feature information to obtain a restored high frequency signal; and performing sub-band synthesis on the restored low frequency signal and the restored high frequency signal to obtain a restored audio of the audio coded data.

According to an aspect of an embodiment of this application, an audio decoding apparatus is provided, where the apparatus includes; an encapsulation parsing module, configured to perform encapsulation parsing on to-be-decoded audio coded data to obtain low frequency coded data and high frequency compensation information in the audio coded data; a low frequency decoding module, configured to perform decoding processing on the low frequency coded data to obtain a restored low frequency signal; a high frequency prediction module, configured to determine high frequency prediction information according to the restored low frequency signal based on correlation between a low frequency signal and a high frequency signal; a high frequency restoration module, configured to: perform gain compensation on the high frequency prediction information according to the high frequency compensation information to obtain high frequency feature information, and perform feature restoration on the high frequency feature information to obtain a restored high frequency signal; and an audio synthesis module, configured to perform sub-band synthesis on the restored low frequency signal and the restored high frequency signal to obtain a restored audio of the audio coded data.

According to an aspect of an embodiment of this application, a non-transitory computer-readable storage medium is provided, and a computer program is stored thereon. When being executed by a processor, the computer program implements the audio coding method or the audio decoding method in the foregoing technical solution.

According to an aspect of an embodiment of this application, an electronic device is provided, and the electronic device includes a processor; and a memory, configured to store executable instructions of the processor; the processor being configured to perform the audio coding method or the audio decoding method in the foregoing technical solution by executing the executable instructions.

According to an aspect of an embodiment of this application, a computer program product or a computer program is provided, the computer program product or the computer program including computer instructions, the computer instructions being stored in a computer-readable medium. A processor of a computer device reads the computer instructions from the computer readable medium, and the processor executes the computer instructions, so that the computer device performs the audio coding method or the audio decoding method in the foregoing technical solution.

In the technical solutions provided in the embodiments of this application, based on correlation between a low frequency signal and a high frequency signal, high frequency prediction information may be correspondingly determined according to a to-be-coded low frequency signal, and then high frequency compensation information is determined based on a feature difference between the high frequency prediction information and the to-be-coded high frequency signal. Correspondingly, only the high frequency compensation information may be transmitted in transmission of audio coded data, so that a code bit rate of the high frequency signal can be greatly compressed, and bandwidth pressure of network transmission is reduced. In addition, at a receive end of the audio coded data, the high frequency signal may be reconstructed and restored based on the high frequency compensation information, thereby ensuring integrity and accuracy of the high frequency signal, and avoiding a problem such as audio distortion and poor voice quality that are caused by data compression loss.

DESCRIPTION OF EMBODIMENTS

Figure 1:
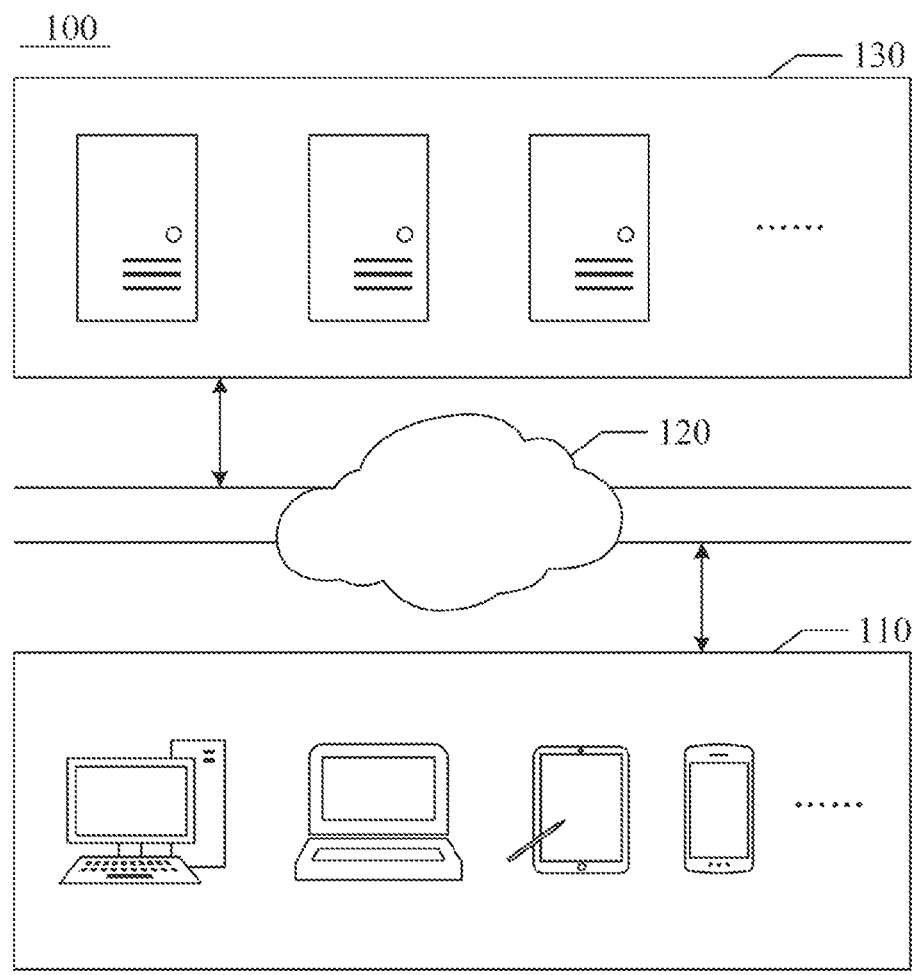
FIG. 1 is a schematic block diagram of an exemplary system architecture to which a technical solution of this application is applied.

FIG. 1 is a schematic block diagram of an exemplary system architecture to which a technical solution of this application is applied.

As shown in FIG. 1, a system architecture 100 may include terminal devices 110, a network 120 and a server 130. The terminal device 110 may include various electronic devices such as a smartphone, a tablet computer, a notebook computer, and a desktop computer. The server 130 may be an independent physical server, or may be a server cluster including a plurality of physical servers or a distributed system, or may be a cloud server providing a cloud computing service. The network 120 may provide communication links of various connection types between the terminal device 110 and the server 130, for example, may be a wired communication link or a wireless communication link.

According to an implementation requirement, the system architecture in this embodiment of this application may have any number of terminal devices, networks, and servers. For example, the server 130 may be a server group that includes multiple server devices. In addition, the technical solution provided in this embodiment of this application may be applied to the terminal device 110, may be applied to the server 130, or may be jointly implemented by the terminal device 110 and the server 130. This is not specifically limited in this application.

For example, in a voice call application, as a voice transmit end, a user A may collect an analog audio signal by using a microphone of the terminal device 110, convert the analog audio signal into a digital audio signal by using an analog-to-digital conversion circuit, compress the digital audio signal by using a voice encoder, and then pack and transmit the digital audio signal to the server 130 according to a communication network transmission format and protocol. The server 130 transmits the voice coded data packet to a user B that serves as a voice receive end. The user B decapsulates the received voice coded data packet by using the terminal device 110, outputs a voice coded compressed bitstream, regenerates a voice digital signal according to the voice coded compressed bitstream by using a voice decoder, and finally converts the voice digital signal and plays voice by using a speaker. Voice coding (e.g., encoding) and decoding can effectively reduce bandwidth required for transmitting a voice signal, and play a decisive role in reducing costs of storing and transmitting voice information and ensuring integrity of voice information in a transmission process of a communication network.

The following describes in detail the audio coding method provided in this application with reference to FIG. 2 to FIG. 8.

Figure 2:
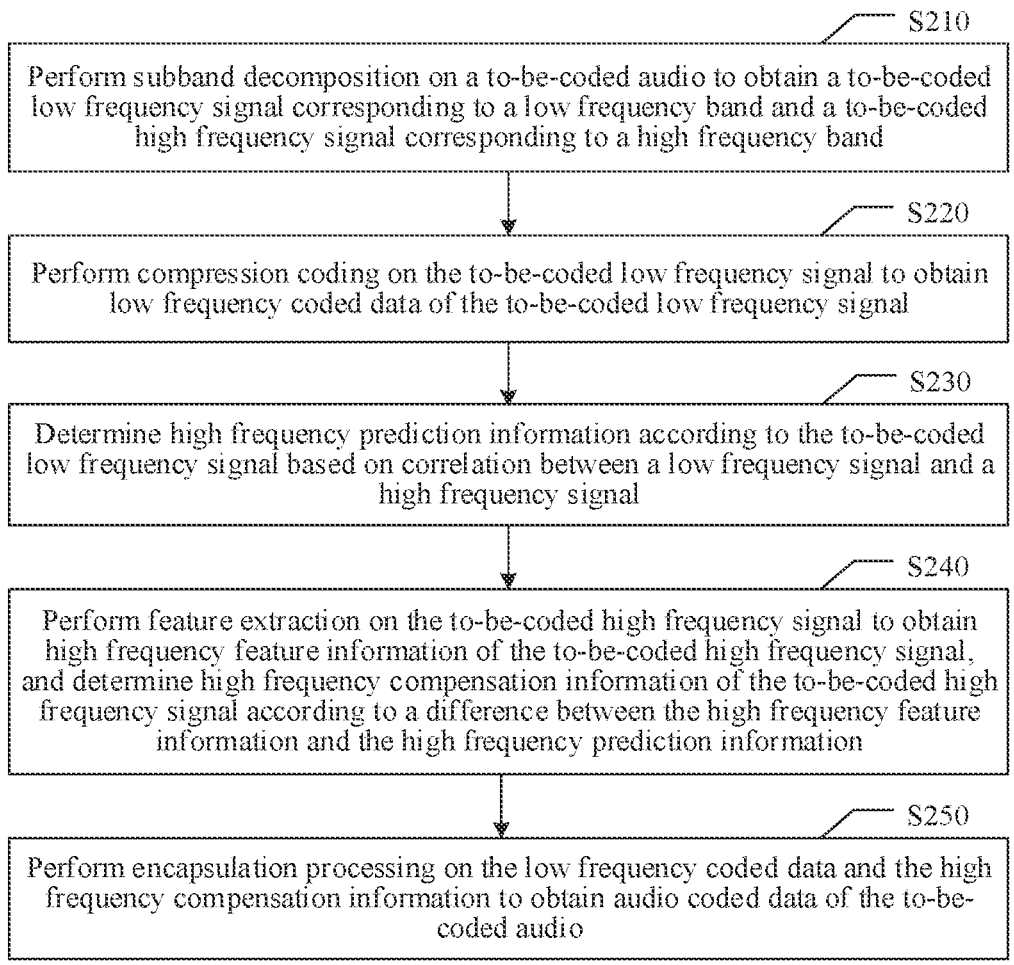
FIG. 2 is a schematic flowchart of steps of an audio coding method according to some embodiments of this application.

FIG. 2 is a schematic flowchart of steps of an audio coding method according to some embodiments of this application. The audio coding method may be performed by a terminal device, may be performed by a server, or may be jointly performed by a terminal device and a server. In this embodiment of this application, an example in which the audio coding method is performed by a terminal device is used for description. As shown in FIG. 2, the audio coding method may mainly include the following steps S210 to step S250.

Step S210. Perform sub-band decomposition on a to-be-coded audio (e.g., audio to be encoded) to obtain a to-be-coded low frequency signal corresponding to a low frequency band and a to-be-coded high frequency signal corresponding to a high frequency band.

Step S220. Perform compression coding on the to-be-coded low frequency signal to obtain low frequency coded data of the to-be-coded low frequency signal.

Step S230. Determine high frequency prediction information according to the to-be-coded low frequency signal based on correlation between a low frequency signal and a high frequency signal.

Step S240. Perform feature extraction on the to-be-coded high frequency signal to obtain high frequency feature information of the to-be-coded high frequency signal, and determine high frequency compensation information of the to-be-coded high frequency signal according to a difference between the high frequency feature information and the high frequency prediction information.

Step S250. Perform encapsulation processing on the low frequency coded data and the high frequency compensation information to obtain audio coded data of the to-be-coded audio.

In the audio coding method provided in the embodiments of this application, based on correlation between a low frequency signal and a high frequency signal, high frequency prediction information may be correspondingly determined according to a to-be-coded low frequency signal, and then high frequency compensation information is determined based on a feature difference between the high frequency prediction information and the to-be-coded high frequency signal. Correspondingly, only the high frequency compensation information may be transmitted in transmission of audio coded data, so that a code bit rate of the high frequency signal can be greatly compressed, and bandwidth pressure of network transmission is reduced. In addition, at a receive end of the audio coded data, the high frequency signal may be reconstructed and restored based on the high frequency compensation information, thereby ensuring integrity and accuracy of the high frequency signal, and avoiding a problem such as audio distortion and poor voice quality that are caused by data compression loss.

The following separately describes in detail each method step of the audio coding method in the foregoing embodiment.

In step S210, perform sub-band decomposition on a to-be-coded audio to obtain a to-be-coded low frequency signal corresponding to a low frequency band and a to-be-coded high frequency signal corresponding to a high frequency band.

Sub-band decomposition is a process in which an original to-be-coded audio is converted from a time domain to a frequency domain, and then a complete frequency band is decomposed into several consecutive frequency bands according to a frequency size. Each frequency band is referred to as a sub-band.

In some embodiments of this application, a quadrature mirror filter including a low-pass filter corresponding to a low frequency band and a high-pass filter corresponding to a high frequency band may be obtained, and then sub-band decomposition is performed on a to-be-coded audio by using the quadrature mirror filter, to obtain a to-be-coded low frequency signal corresponding to the low frequency band and a to-be-coded high frequency signal corresponding to the high frequency band.

The quadrature mirror filter (QMF) is formed by combining two or more filters by using a common input interface or a common output interface. In this embodiment of this application, the low-pass filter corresponding to the low frequency band and the high-pass filter corresponding to the high frequency band may form the quadrature mirror filter by using a common input interface, and after the to-be-coded audio is input to the quadrature mirror filter, the to-be-coded low frequency signal output by the low-pass filter and the to-be-coded high frequency signal output by the high-pass filter may be obtained after sub-band decomposition. An advantage of using the quadrature mirror filter is that a spectral aliasing effect due to sub-band decomposition can be offset.

In step S220, perform compression coding on the to-be-coded low frequency signal to obtain low frequency coded data of the to-be-coded low frequency signal.

For the to-be-coded low frequency signal obtained by sub-band decomposition, an encoder may perform compression coding on the to-be-coded low frequency signal to obtain the corresponding low frequency coded data. A basic idea of audio compression coding is to remove time domain redundancy, frequency domain redundancy, and auditory redundancy of an audio signal by using the encoder, so as to achieve audio signal compression. An existing audio compression coding method may mainly include: compressing redundancy information based on methods such as long-term prediction (LTP), LPC short-term prediction, pitch period search, and frequency band replication.

In some embodiments of this application, coding algorithms such as Code Excited Linear Prediction (CELP), SILK, or ACC may be used to perform compression coding on a low frequency signal to be coded. The CELP coding algorithm is an effective medium-to-low bit rate speech compression coding technology. The CELP coding algorithm uses a codebook as an excitation source, and has advantages such as a low bit rate, high synthetic voice quality, and strong anti-noise capability. It is widely used in a 4.8-16 kbps bit rate. A voice encoder that uses the CELP technology includes G.723, G.728, G.729, G.722.2, and the like. The SILK coding algorithm is a broadband (e.g., wideband) audio encoder developed based on the instant messaging software Skype and provided to third-party developers and hardware manufacturers. The SILK coding algorithm has good flexibility for audio bandwidth, network bandwidth, and algorithm complexity. The ACC coding algorithm, that is, advanced audio coding, is an audio compression algorithm that has a high compression ratio based on MPEG-2. Because a multi-channel and a low-complexity description manner are used, the ACC coding algorithm can provide (e.g., preserve) relatively good voice quality when audio data is greatly compressed.

In step S230, determine high frequency prediction information according to the to-be-coded low frequency signal based on correlation between a low frequency signal and a high frequency signal.

Figure 3:
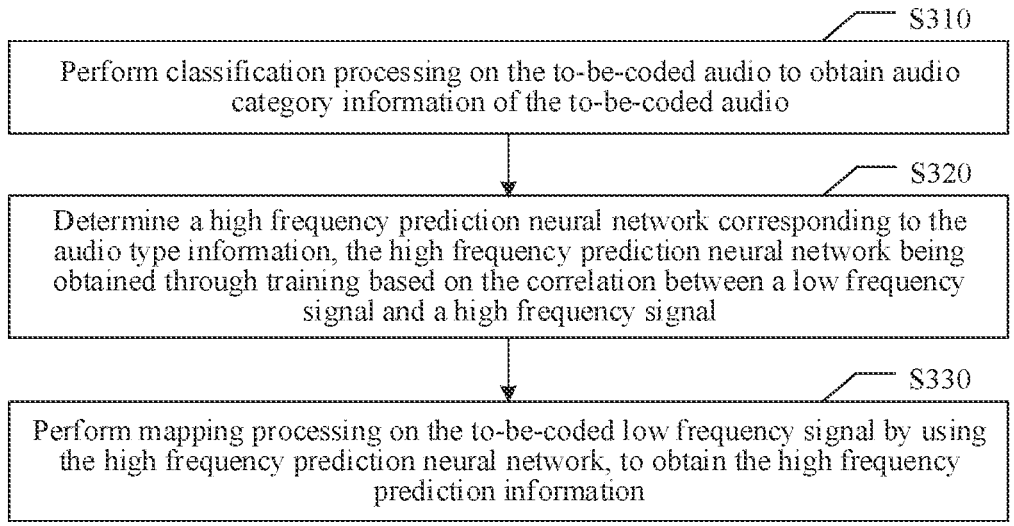
FIG. 3 is a schematic flowchart of steps of a method for obtaining high frequency prediction information by an encoder side according to some embodiments of this application.

FIG. 3 is a schematic flowchart of a method for obtaining high frequency prediction information by an encoder side according to some embodiments of this application. As shown in FIG. 3, based on the foregoing embodiment, step S230 of determining high frequency prediction information according to the to-be-coded low frequency signal based on correlation between a low frequency signal and a high frequency signal may mainly include the following step S310 to step S330.

Step S310. Perform classification processing on the to-be-coded audio to obtain audio category information of the to-be-coded audio.

Step S320. Determine a high frequency prediction neural network corresponding to the audio category information; the high frequency prediction neural network being obtained through training based on the correlation between a low frequency signal and a high frequency signal.

Step S330. Perform mapping processing on the to-be-coded low frequency signal by using the high frequency prediction neural network, to obtain the high frequency prediction information.

The low frequency signal and the high frequency signal of the audio data are correlated. However, the neural network (especially a deep neural network) may better describe the correlation herein. Therefore, in this embodiment of this application, the low frequency signal is used as an input and the high frequency signal is used as a target for prediction. However, correlation between high and low frequency signals of audio data of different types is different. For example, a voice signal has an obvious harmonic structure; therefore, both a low frequency signal and a high frequency signal have a similar spectral harmonic structure. A light-tone signal (e.g., a soft voice, a low-keyed voice, a low-pitched voice, etc.) has no harmonic component, and is characterized in that medium-high frequency energy presents block distribution, and high frequency energy is far higher than the low frequency energy. A musical signal is related to vocalization features of different vocal instruments. It can be learned that for different types of audio data, a specific mapping relationship between a low frequency signal and a high frequency signal of the audio data may be different. In this embodiment of this application, in view of this problem, a solution of first performing signal classification on the audio data, and then performing training and prediction by using different types of neural networks based on a classification result is proposed to obtain a more stable and accurate prediction result.

The high frequency prediction neural network used in this embodiment of this application may be implemented by using various different network architectures, such as a convolutional neural network (CNN), a recurrent neural network (RNN), and a generative adversarial network (GAN). In addition, in some implementations, mapping processing may be performed on the to-be-coded low frequency signal by using another machine learning model except the neural network to obtain corresponding high frequency prediction information, which is not specifically limited in this application.

Figure 4:
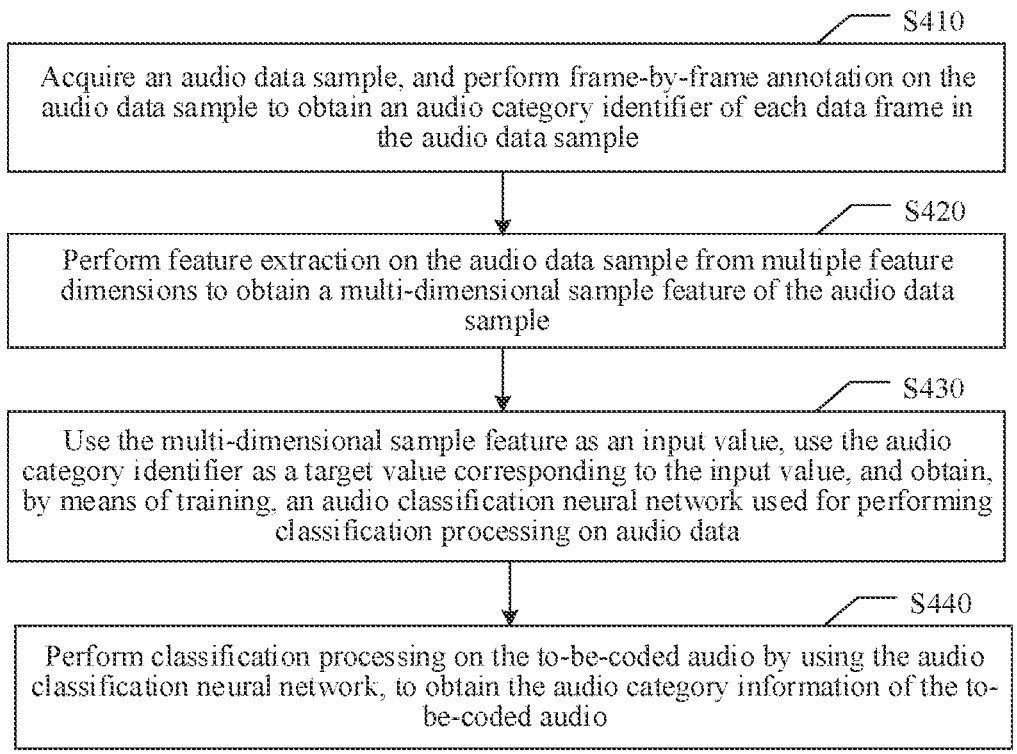
FIG. 4 is a schematic flowchart of steps of a method for performing classification processing on a to-be-coded audio according to some embodiments of this application.

FIG. 4 is a schematic flowchart of steps of a method for classifying audio to be encoded according to some embodiments of this application. As shown in FIG. 4, based on the foregoing embodiments, step S310 of performing classification processing on the to-be-coded audio to obtain audio category information of the to-be-coded audio may include the following step S410 to step S440.

Step S410. Acquire an audio data sample, and perform frame-by-frame annotation on the audio data sample to obtain an audio category identifier of each data frame in the audio data sample.

The audio data sample may be real audio data collected by an audio input device such as a microphone, or may be artificially constructed data synthesized by using audio synthesis software. The audio data sample includes various types of data, such as voiced sound, light tone, non-voice, and music. The audio data sample is annotated in units of data frames to obtain an audio category identifier of each data frame.

Step S420. Perform feature extraction on the audio data sample from multiple feature dimensions to obtain a multi-dimensional sample feature of the audio data sample.

To accurately acquire a determining factor for determining a category of the audio data sample, in this step, feature extraction is performed on the audio data sample from multiple feature dimensions, so as to obtain a multi-dimensional sample feature with a relatively strong representation capability. For example, in some implementations, the extracted multi-dimensional sample feature may include features of multiple dimensions such as a spectral flatness feature, a spectral slope feature, a pitch period, modified discrete cosine transform (MDCT), and a first-order/second-order derivative thereof.

Step S430. Use the multi-dimensional sample feature as an input value, use the audio category identifier as a target value corresponding to the input value, and obtain, by means of training, an audio classification neural network used for performing classification processing on audio data.

A training objective of the audio classification neural network is: For an audio data sample, when a multi-dimensional sample feature of the audio classification neural network is input, a correct audio category identifier can be output. In a training process, a network parameter of the neural network may be updated to improve a prediction capability of outputting the correct audio category identifier. When the training reaches a preset convergence target, the training process may be ended. For example, the convergence target may be that an error of a loss function is less than an error threshold or a quantity of times of iterative training exceeds a quantity threshold.

Step S440. Classify (e.g., perform classification processing) on the to-be-coded audio by using the audio classification neural network, to obtain the audio category information of the to-be-coded audio.

For the to-be-coded audio, a corresponding multi-dimensional audio feature is obtained by using a feature extraction manner that is the same as that of the audio data sample, and then the extracted multi-dimensional audio feature may be input into a trained audio classification neural network. After corresponding processing is performed by the audio classification neural network, audio category information with a highest prediction probability is output.

By performing step S410 to step S440, the audio classification neural network may be obtained by means of training by using the audio data sample, and then the audio category of the to-be-coded audio is accurately predicted by using the audio classification neural network. Upon completion of training, a network structure and a network parameter of the audio classification neural network may be stored at a terminal device as an encoder side or stored at a server. When classification processing needs to be performed on a new to-be-coded audio, the audio classification neural network may be directly invoked to quickly and accurately determine audio category information of the new to-be-coded audio.

For different types of audios to be encoded, different types of high frequency prediction neural networks (e.g., neural networks for predicting high frequency components) may be correspondingly trained and selected, so as to implement a solution of high frequency prediction based on a low frequency signal to be encoded. For example, in some embodiments of this application, the to-be-coded audio is classified into four types: voiced sound, light tone (e.g., soft voice), non-voice, and music. Correspondingly, four types of high frequency prediction neural networks may be obtained by means of training. Each type of high frequency prediction neural network is specifically configured to predict information from a low frequency signal to a high frequency signal for a corresponding type of to-be-coded audio. In addition, in this embodiment of this application, the to-be-coded audio may be further subdivided into more audio categories according to spectrum energy distribution, and the more detailed classification is performed, a corresponding high frequency prediction neural network has a more accurate representation and prediction capability.

Figure 5:
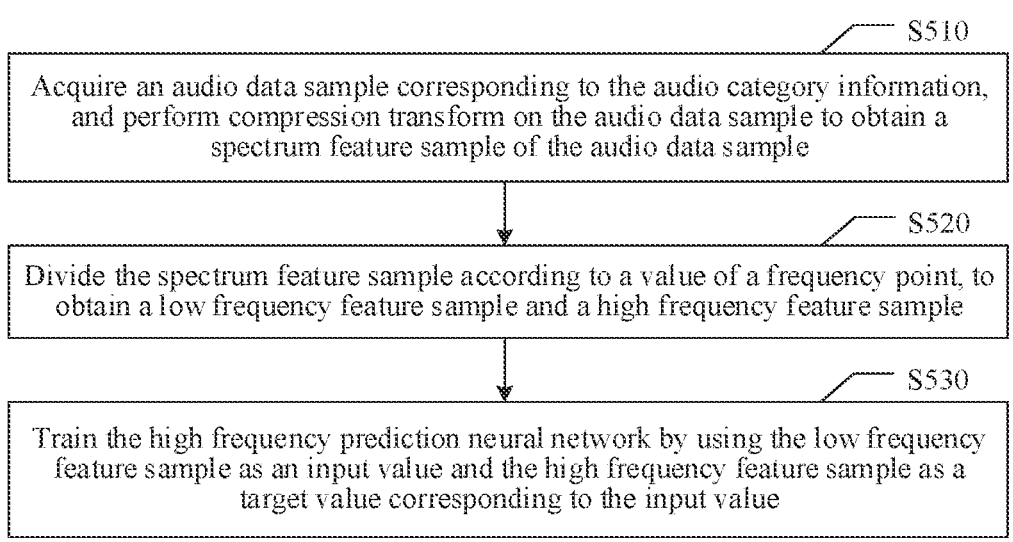
FIG. 5 is a schematic flowchart of steps of a method for training a high frequency prediction neural network based on a preprocessing process of first feature extraction and then frequency band segmentation according to some embodiments of this application.
Figure 6:
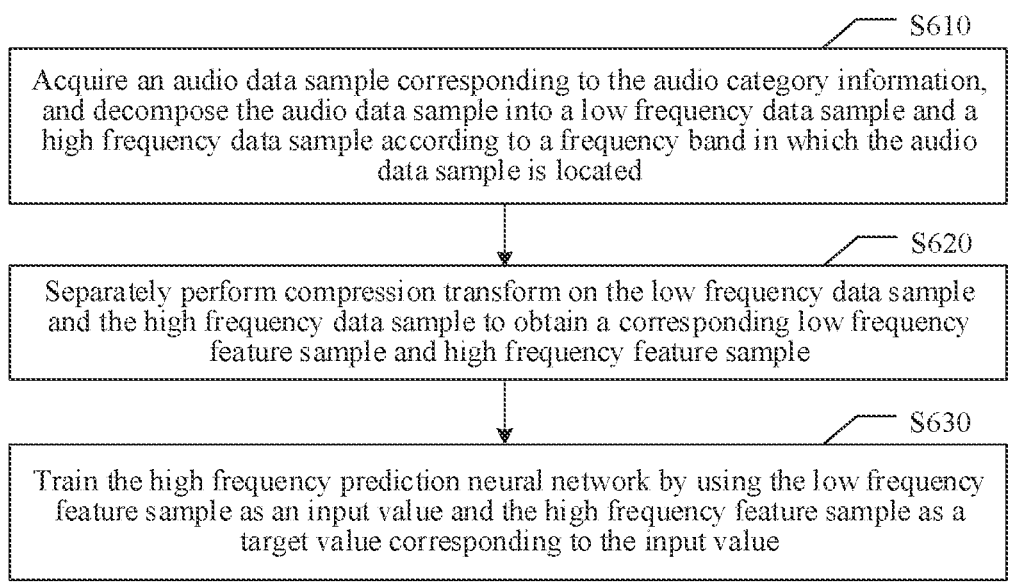
FIG. 6 is a schematic flowchart of steps of a method for training a high frequency prediction neural network based on a preprocessing process of first frequency band segmentation and then feature extraction according to some embodiments of this application.

During training of the high frequency prediction neural network, two preprocessing processes are involved: frequency band segmentation and feature extraction of the audio data sample. FIG. 5 and FIG. 6 show two methods for training a high frequency prediction neural network based on different preprocessing processes, respectively.

FIG. 5 is a schematic flowchart of steps of a method for training a high frequency prediction neural network based on a preprocessing process of first feature extraction and then frequency band segmentation according to some embodiments of this application. As shown in FIG. 5, the method for training a high frequency prediction neural network may mainly include the following step S510 to step S530.

Step S510. Acquire an audio data sample corresponding to the audio category information, and perform compression transform on the audio data sample to obtain a spectrum feature sample of the audio data sample.

By performing feature extraction on the audio data sample in a compression transform manner, the spectrum feature sample of the audio data sample may be obtained. For example, MDCT may be used in a compression transform method. MDCT is a linear orthogonal overlapping transform algorithm. A time domain alias cancellation (TDAC) technology is used, and includes a 50% time domain overlapping window, so that periodic noise generated by an edge effect can be effectively overcome without reducing coding performance. In some other embodiments of this application, discrete Fourier transform (DFT) may also be used for performing compression transform on the audio data sample.

Step S520. Divide the spectrum feature sample according to a value of a frequency point, to obtain a low frequency feature sample and a high frequency feature sample.

The MDCT algorithm is used as an example. The spectrum feature sample obtained by performing compression transform on the audio data sample in step S510 is all-band data. The spectrum feature sample may be divided into a high frequency MDCT part and a low frequency MDCT part according to a corresponding physical frequency point value. For example, after MDCT processing is performed on an audio data sample that includes 1024 frequency points, a spectrum feature sample that includes 512 frequency points may be obtained, where 1-256 points of data may be divided into low frequency feature samples, and 257-512 points of data may be divided into high frequency feature samples.

Step S530. Train the high frequency prediction neural network by using the low frequency feature sample as an input value and the high frequency feature sample as a target value corresponding to the input value.

A training objective of the high frequency prediction neural network is to improve a representation and prediction capability of correlation between a low frequency signal and a high frequency signal by updating a network parameter. The high frequency prediction neural network may use various types of network architectures such as CNN, RNN, and GAN. In addition, this embodiment of this application may also train another machine learning model except the neural network, so as to predict a high frequency signal according to a low frequency signal. This is not specifically limited in this application.

By performing steps S510-S530, compression transform may be first performed on a full-band audio data sample, and then frequency band segmentation is performed based on a frequency point value to obtain a low frequency feature sample and a high frequency feature sample. An advantage of this preprocessing solution is that only one compression transform operation and one frequency band segmentation operation need to be performed on each audio data sample, which can reduce data calculation costs and improve sample processing efficiency.

FIG. 6 is a schematic flowchart of steps of a method for training a high frequency prediction neural network based on a preprocessing process of first frequency band segmentation and then feature extraction according to some embodiments of this application. As shown in FIG. 6, the method for training a high frequency prediction neural network may mainly include the following step S610 to step S630.

Step S610. Acquire an audio data sample corresponding to the audio category information, and decompose the audio data sample into a low frequency data sample and a high frequency data sample according to a frequency band in which the audio data sample is located.

Step S620. Separately perform compression transform on the low frequency data sample and the high frequency data sample to obtain a corresponding low frequency feature sample and high frequency feature sample.

Step S630. Train the high frequency prediction neural network by using the low frequency feature sample as an input value and the high frequency feature sample as a target value corresponding to the input value.

A difference between this embodiment of this application and the embodiment corresponding to FIG. 5 lies in that, in this embodiment of this application, a preprocessing solution in which frequency band segmentation is performed on the audio data sample before compression transform is performed is used. Compared with the embodiment corresponding to FIG. 5, a compression transform process is added to each audio data sample in the preprocessing solution in this embodiment of this application, that is, one time of compression transform needs to be separately performed on a low frequency data sample and a high frequency data sample. An advantage of this preprocessing solution is that consistency between a training process and a use process of the high frequency prediction neural network is maintained, and accuracy of high frequency signal prediction can be improved to a certain extent.

After the high frequency prediction neural network is obtained by means of training in the foregoing embodiment, a network structure and a network parameter of the high frequency prediction neural network may be stored on a terminal device at an encoder side, a terminal device at a decoder side, or a server. When high frequency prediction needs to be performed on a low frequency signal, the high frequency prediction neural network may be directly invoked.

In some embodiments of this application, a corresponding high frequency prediction signal may be obtained by performing mapping processing on a to-be-coded low frequency signal by directly using the high frequency prediction neural network in step S330. In some other embodiments, to maintain data synchronization between the encoder side and the decoder side, low frequency coded data (obtained by compression coding a to-be-coded low frequency signal) may be decoded first to obtain a low frequency decoded signal corresponding to the to-be-coded low frequency signal, and then, the high frequency prediction neural network is used for mapping the low frequency decoded signal to obtain high frequency prediction information. After a coding and decoding operation is performed on the to-be-coded low frequency signal, operation consistency between the encoder side and the decoder side can be maintained, thereby improving accuracy of high frequency prediction.

In some embodiments of this application, a method for performing mapping processing on a low frequency decoded signal by using a high frequency prediction neural network may include: performing compression transform on the low frequency decoded signal to obtain a low frequency spectrum feature of the low frequency decoded signal, and then performing mapping processing on the low frequency spectrum feature by using the high frequency prediction neural network to obtain high frequency prediction information. A method for performing compression transform on a low frequency decoded signal may be, for example, MDCT or another form of DFT.

In step S240, perform feature extraction on the to-be-coded high frequency signal to obtain high frequency feature information of the to-be-coded high frequency signal, and determine high frequency compensation information of the to-be-coded high frequency signal according to a difference between the high frequency feature information and the high frequency prediction information.

In some embodiments, the method for performing feature extraction on the to-be-coded high frequency signal may be the compression transform method same as that of the to-be-coded low frequency signal (or the low frequency decoded signal), that is, compression transform is performed on the to-be-coded high frequency signal to obtain high frequency feature information of the to-be-coded high frequency signal. By using the same feature extraction method, high frequency feature information and high frequency prediction information can have the same feature attribute, so that it is convenient to determine a feature difference between the high frequency feature information and the high frequency prediction information.

Figure 7:
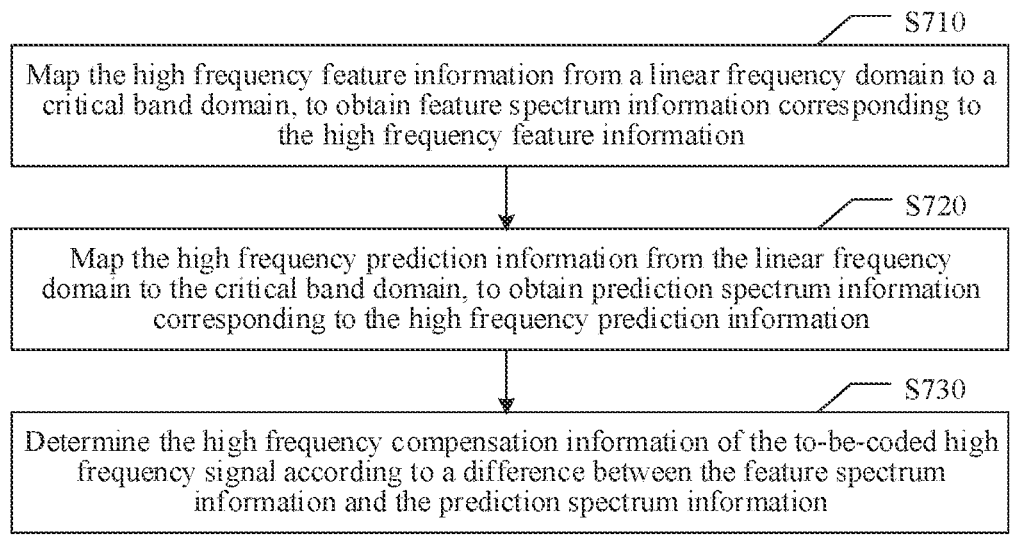
FIG. 7 is a schematic flowchart of steps of a method for determining high frequency compensation information according to some embodiments of this application.

The high frequency compensation information of the to-be-coded high frequency signal may be determined based on the feature difference between the high frequency feature information and the high frequency prediction information. FIG. 7 is a schematic flowchart of steps of a method for determining high frequency compensation information according to some embodiments of this application. As shown in FIG. 7, based on the foregoing embodiments, step S240 of determining high frequency compensation information of the to-be-coded high frequency signal according to a difference between the high frequency feature information and the high frequency prediction information may mainly include the following step S710 to step S730.

Step S710. Map the high frequency feature information from a linear frequency domain to a critical band domain, to obtain feature spectrum information corresponding to the high frequency feature information.

Step S720. Map the high frequency prediction information from a linear frequency domain to a critical band domain, to obtain prediction spectrum information corresponding to the high frequency prediction information.

Step S730. Determine the high frequency compensation information of the to-be-coded high frequency signal according to a difference between the feature spectrum information and the prediction spectrum information.

The critical band domain, that is, a Bark domain, is a technical term for audiology and psychoacoustics. The critical band refers to a frequency bandwidth of an auditory filter generated by construction of an auditory sensing organ (for example, cochlea in a human ear structure). Generally speaking, the critical band is a sound frequency band, and the first single-tone sense in the critical band is interfered by an auditory mask of the second single-tone. In acoustic research, people use auditory filters to simulate different critical bands. A human ear structure generally resonates with 24 frequency points. Therefore, audio signals in the critical band domain also present 24 critical bands, from 1 to 24. Compared with a linear domain, the Bark domain is more consistent with a perception feature of an acoustic frequency of a human ear, and a quantity of sub-bands is relatively small, which facilitates coding compression.

To implement a quantitative representation of the difference between the feature spectrum information and the prediction spectrum information, in this embodiment of this application, logarithmic transform may be separately performed on the feature spectrum information and the prediction spectrum information to obtain a feature spectrum logarithmic value and a prediction spectrum logarithmic value, and then a gain quantization value is obtained by querying a gain code table according to a difference between the feature spectrum logarithmic value and the prediction spectrum logarithmic value, and the gain quantization value is determined as the high frequency compensation information of the to-be-coded high frequency signal. The gain code table is a quantization table whose size is N and whose values are incremented successively. Based on the gain code table, the gain quantization value may be obtained by querying.

For example, after the high frequency feature information or the high frequency prediction information is mapped from the linear frequency domain to the critical band domain, corresponding spectral information E(k) in the Bark domain may be obtained, and then logarithmic transform may be performed on the spectral information to obtain a corresponding spectral logarithmic value 20*log 10(E(k)^2), so as to determine a difference ΔE(k) between the feature spectrum logarithmic value and the prediction spectrum logarithmic value, where k represents a high frequency sub-band sequence number.

A query logic for numerically quantizing the difference ΔE(k) by querying the gain code table is as follows:

```
Index = 0;
For i=0:N-1
    If  Table[i] <= ΔE(k) && Table[i+1] > ΔE(k)
        Index = i;
    End
End
```

Table is a gain code table that is numerically incremented; N is a size of the gain code table, and indicates that the gain code table includes total N quantization values from 0 to N−1; and Index is a gain quantization value obtained by means of final quantization.

It can be learned from the foregoing query logic that, after the difference ΔE(k) between the feature spectrum logarithmic value and the prediction spectrum logarithmic value is obtained, all quantization values in the gain code table may be traversed, and a value size between the difference ΔE(k) and each of an $i^{th}$ quantization code Table[i] and an $(i+1)^{th}$ quantization code Table[i+1] is compared. If the difference ΔE(k) is greater than or equal to the $i^{th}$ quantization code Table[i], and the difference ΔE(k) is less than the $(i+1)^{th}$ quantization code Table[i+1], it may be determined that the gain quantization value is i.

The gain compensation is quantized by using the gain code table, original continuous gain compensation information can be discretized, thereby reducing a calculation amount of coding and transmitting a high frequency signal part.

In step S250, perform encapsulation processing on the low frequency coded data and the high frequency compensation information to obtain audio coded data of the to-be-coded audio.

The encapsulation process is a process in which a specified audio file is formed by combining various coded content. For example, the encapsulated audio coded data may be audio files in various formats such as MP3, AAC, WAV, FLAC, and DSD.

In some embodiments of this application, w % ben audio coding is performed, classification processing is first performed on a to-be-coded audio to obtain corresponding audio category information, and then high frequency prediction neural networks of different types are selected based on the audio category information to perform targeted high frequency prediction on a to-be-coded low frequency signal. On this basis, to accurately predict and reconstruct the signal of the high frequency part at the decoder side, in step S250, the audio category information obtained by means of classification processing may be obtained, and then the audio category information, the low frequency coded data, and the high frequency compensation information are jointly encapsulated to obtain audio coded data of the to-be-coded audio, so as to transmit the audio category information to the decoder side together.

Figure 8:
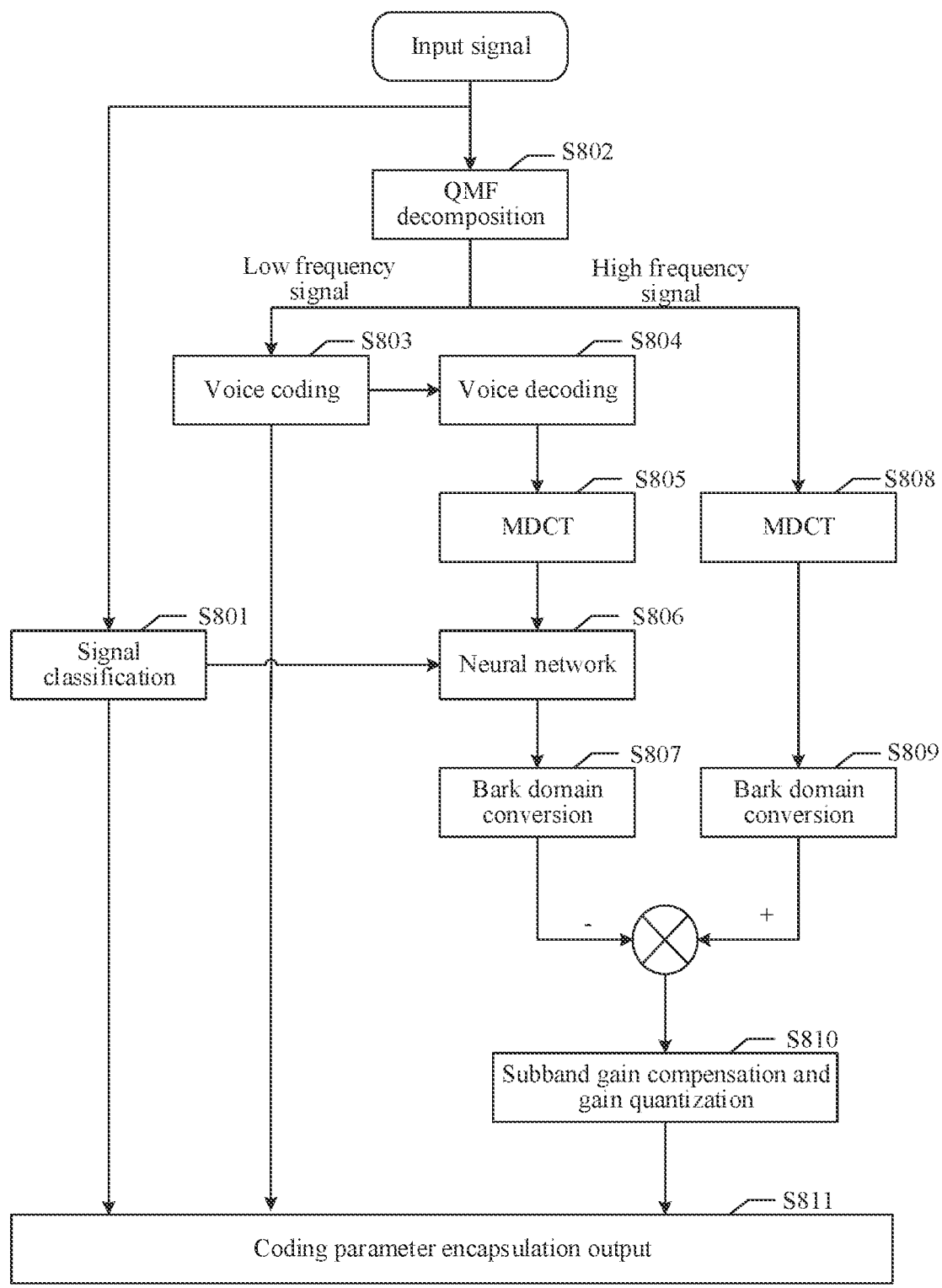
FIG. 8 is a schematic flowchart of a method for performing coding processing on an input signal in an application scenario according to an embodiment of this application.

FIG. 8 is a schematic flowchart of a method for performing coding processing on an input signal in an application scenario according to an embodiment of this application. As shown in FIG. 8, in this application scenario, the method for performing audio coding on an input signal by an encoder side may mainly include the following step S801 to step S811.

Step S801. Perform signal classification on the input signal to obtain a signal classification result. The classification type herein may include four types: voiced sound, light tone, non-voice, and music. The signal classification result can guide selection of a high frequency prediction neural network. Each signal type is corresponding to one high frequency prediction neural network. After a large quantity of audio data is classified, each high frequency prediction neural network performs independent training by using corresponding data of the same type. In actual coding and decoding, a trained high frequency prediction neural network is used.

Step S802. Decompose the input signal into high and low frequency signals by using a QMF. An advantage of using the QMF is that an aliasing effect due to sub-band segmentation can be offset. The input signal is decomposed into a low frequency signal and a high frequency signal by using the QMF.

Step S803. A voice encoder performs compression coding on the low frequency signal obtained by means of decomposition in step S802 to obtain a low frequency coding parameter of the corresponding low frequency signal. The voice encoder used in this step may be an encoder based on an algorithm such as CELP, SILK, and AAC.

Step S804. To enable input of the high frequency prediction neural network to be synchronized between the encoder and a decoder, perform voice decoding on a bitstream coded by using the low frequency signal to obtain a restored low frequency signal.

Step S805. Perform MDCT on the low frequency signal restored by performing voice decoding in step S804 to obtain related low frequency spectrum information.

Step S806. Input the low frequency spectrum information obtained by means of MDCT to the high frequency prediction neural network selected according to the signal classification result in step S801, and predict high frequency prediction information by using the high frequency prediction neural network.

Step S807. In order to correspond to an acoustic sensing (e.g., acoustic perception) frequency band of a human ear, convert the high frequency prediction information from a linear frequency domain to a Bark domain to obtain a Bark domain high frequency spectrum prediction value (which can be represented in a logarithmic form).

Step S808. Perform MDCT on the real high frequency signal obtained by means of QMF decomposition in step S802 to obtain related high frequency spectrum information.

Step S809. Perform Bark domain conversion on the high frequency spectrum information obtained in step S808 to obtain a Bark domain high frequency spectrum real value (which may be represented in a logarithmic form).

Step S810. Subtract the Bark domain high frequency spectrum real value obtained in step S809 from the Bark domain high frequency spectrum prediction value obtained in step S807 to obtain a sub-band gain compensation value, and further quantize the gain to obtain a high frequency coding parameter.

Step S811. After encapsulation processing is performed on the signal classification result obtained in step S801, the low frequency coding parameter obtained in step S803, and the high frequency coding parameter obtained in step S810, form a coding parameter for outputting.

The coding parameter obtained by using the foregoing coding procedure may be transmitted to another terminal device that serves as an audio data receive end or a server by using a network, so that the receive end performs decoding processing on the coding parameter to obtain a decoded signal.

The following describes in detail an audio decoding method provided in this application with reference to FIG. 9 to FIG. 12.

Figure 9:
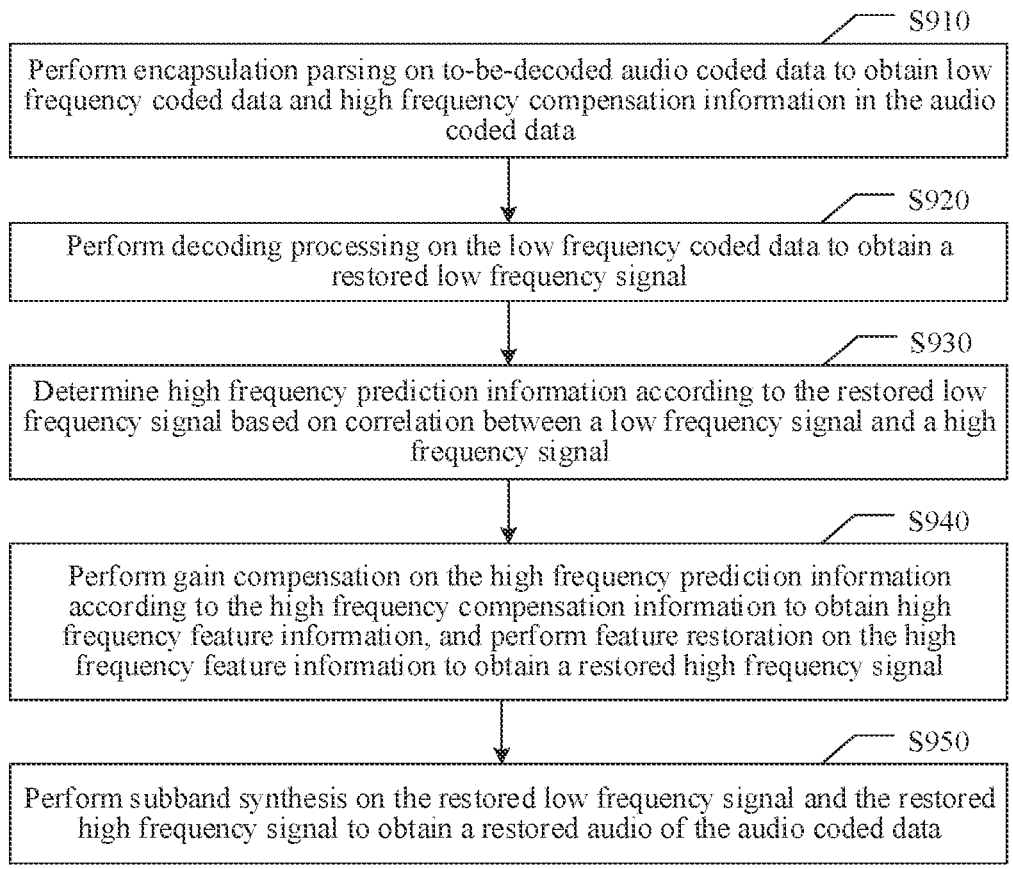
FIG. 9 is a schematic flowchart of steps of an audio decoding method according to some embodiments of this application.

FIG. 9 is a schematic flowchart of steps of an audio decoding method according to some embodiments of this application. The audio decoding method may be performed by a terminal device, may be performed by a server, or may be jointly performed by a terminal device and a server. In this embodiment of this application, an example in which the audio decoding method is performed by a terminal device is used for description. As shown in FIG. 9, the audio decoding method may mainly include the following steps S910 to step S950.

Step S910. Perform encapsulation parsing on to-be-decoded audio coded data to obtain low frequency coded data and high frequency compensation information in the audio coded data.

Step S920. Perform decoding processing on the low frequency coded data to obtain a restored low frequency signal.

Step S930. Determine high frequency prediction information according to the restored low frequency signal based on correlation between a low frequency signal and a high frequency signal.

Step S940. Perform gain compensation on the high frequency prediction information according to the high frequency compensation information to obtain high frequency feature information, and perform feature restoration on the high frequency feature information to obtain a restored high frequency signal.

Step S950. Perform sub-band synthesis on the restored low frequency signal and the restored high frequency signal to obtain a restored audio of the audio coded data.

In the audio decoding method provided in this embodiment of this application, based on the correlation between the low frequency signal and the high frequency signal, the corresponding high frequency prediction information may be determined according to the restored low frequency signal obtained by means of decoding, then gain compensation is performed on the high frequency prediction information by using the high frequency compensation information to obtain the high frequency feature information, and then feature restoration is performed on the high frequency feature information to obtain a predicted reconstructed restored high frequency signal. In the audio decoding method, the same high frequency signal prediction method and high frequency gain compensation method are used at an encoder side and a decoder side, to ensure integrity and accuracy of a high frequency signal in a signal transmission process, thereby avoiding a problem such as audio distortion and poor voice quality that are caused by data compression loss.

The following separately describes in detail each method step of the audio decoding method in the foregoing embodiment.

In step S910, perform encapsulation parsing on to-be-decoded audio coded data to obtain low frequency coded data and high frequency compensation information in the audio coded data.

The to-be-decoded audio coded data may include consecutive bitstream units, and every two adjacent bitstream units are separated by using bitstream unit separation information. For example, when an advanced audio coding (AAC) coding standard is used, audio coded data includes multiple consecutive audio data transport stream (ADTS) units, and each ADTS unit serves as an encapsulation unit of audio content. Every two ADTS units are separated by a synchronization word (syncword), which may be 0xFFF (binary "111111111111").

In some implementations of this application, a method for performing encapsulation parsing on to-be-decoded audio coded data may include: first searching for bitstream unit separation information in the to-be-decoded audio coded data; then separating a to-be-decoded bitstream unit from the audio coded data according to the found bitstream unit separation information; and then performing field parsing on the bitstream unit to obtain the low frequency coded data and the high frequency compensation information that are encapsulated in the bitstream unit. The AAC coding standard is used as an example. After receiving the to-be-decoded audio coded data, a decoder side may search for a field 0x0FFF in an original bitstream. An ADTS unit may be obtained by means of separation by using the field as an interval, and then field parsing is performed on the ADTS unit to obtain low frequency coded data and high frequency compensation information that are encapsulated therein.

By performing encapsulation parsing on the audio coded data, low frequency coded data corresponding to a low frequency signal part and high frequency compensation information corresponding to a high frequency signal part that are included in the audio coded data may be obtained. In addition, if classification processing is performed on the audio data at the encoder side, audio category information included in the audio data may be further obtained after encapsulation parsing in this step, so that a processing solution consistent with that at the encoder side is selected according to the audio category information.

In step S920, perform decoding processing on the low frequency coded data to obtain a restored low frequency signal.

For the low frequency coded data obtained by means of encapsulation parsing, a decoder may decode the low frequency coded data to obtain a corresponding restored low frequency signal. The decoder used in this step corresponds to the encoder used by the encoder side. For example, if the encoder side performs compression coding by using the CELP algorithm, this step also performs decoding processing by using a corresponding CELP algorithm. If the encoder side performs compression coding by using an algorithm such as SILK or ACC, this step also performs decoding processing by using an algorithm such as the corresponding SILK or ACC.

In step S930, determine high frequency prediction information according to the restored low frequency signal based on correlation between a low frequency signal and a high frequency signal.

Figure 10:
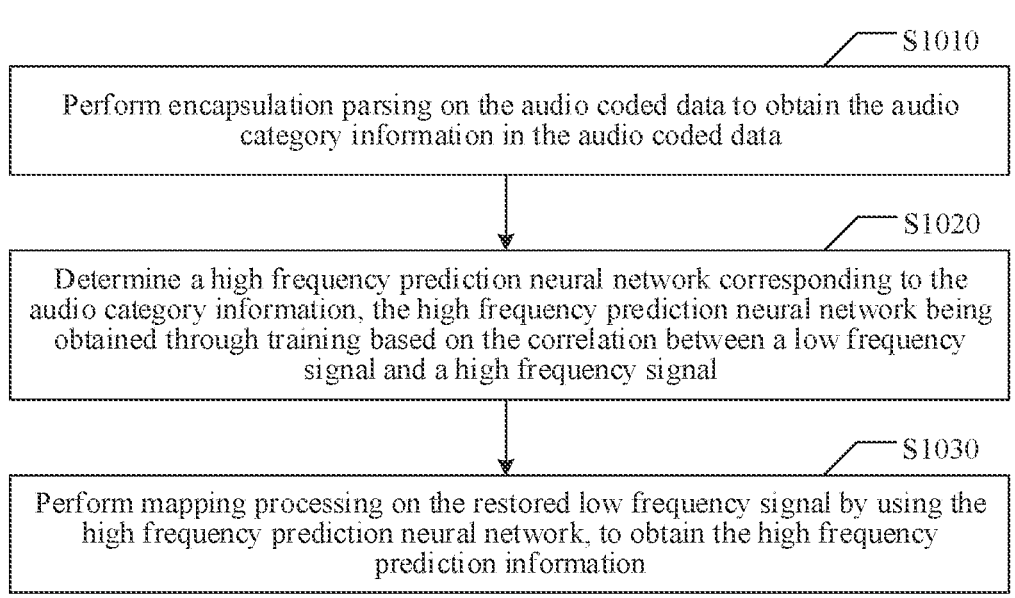
FIG. 10 is a schematic flowchart of steps of a method for obtaining high frequency prediction information by a decoder according to some embodiments of this application.

FIG. 10 is a schematic flowchart of steps of a method for obtaining high frequency prediction information by a decoder according to some embodiments of this application. As shown in FIG. 10, based on the foregoing embodiment, step S930 of determining high frequency prediction information according to the restored low frequency signal based on correlation between a low frequency signal and a high frequency signal may mainly include the following step S1010 to step S1030.

Step S1010. Perform encapsulation parsing on the audio coded data to obtain the audio category information in the audio coded data.

Step S1020. Determine a high frequency prediction neural network corresponding to the audio category information; the high frequency prediction neural network being obtained through training based on the correlation between a low frequency signal and a high frequency signal.

Step S1030. Perform mapping processing on the restored low frequency signal by using the high frequency prediction neural network, to obtain the high frequency prediction information.

By performing encapsulation parsing the audio coded data, the audio category information determined when the encoder side performs classification processing on the audio data may be obtained. The audio category information is used at the encoder side to guide selection of the high frequency prediction neural network. In this embodiment of this application, the applicable decoder side may also select, based on the audio category information, a high frequency prediction neural network that is the same as that of the encoder side, so that consistency of high frequency signal prediction can be maintained between the decoder side and the encoder side.

In some embodiments of this application, a high frequency prediction neural network may be trained on the encoder side, and after the high frequency prediction neural network is obtained by means of training, a network structure and a network parameter of the high frequency prediction neural network may be stored on the encoder side, and related data may also be transmitted to the decoder side. In this way, after loading the network parameter based on the received network structure, the decoder side may obtain a high frequency prediction neural network that is consistent with that on the encoder side.

In another embodiment of this application, after the decoder side trains a high frequency prediction neural network, a network structure and a network parameter of the high frequency prediction neural network may be stored on the decoder side, and related data may also be transmitted to the encoder side, so that the encoder side and the decoder side can predict the high frequency signal by using the same high frequency prediction neural network. The method for training the high frequency prediction neural network by the decoder side is similar to or the same as that on the encoder side. For details, refer to related method steps in FIG. 5 and FIG. 6. Details are not described herein again.

In another embodiment of this application, after the server trains a high frequency prediction neural network, a network structure and a network parameter of the high frequency prediction neural network may be stored on the server, and the server transmits related data to the encoder side and the decoder side, so that the encoder side and the decoder side can predict the high frequency signal by using the same high frequency prediction neural network.

When performing mapping processing on the restored low frequency signal by using the high frequency prediction neural network to implement high frequency signal prediction, the decoder side may first perform compression transform on the restored low frequency signal to obtain a low frequency spectrum feature of the restored low frequency signal, and then perform mapping processing on the low frequency spectrum feature by using the high frequency prediction neural network to obtain high frequency prediction information. A method for performing compression transform on a restored low frequency signal may be, for example, MDCT or another form of DFT In step S940, perform gain compensation on the high frequency prediction information according to the high frequency compensation information to obtain high frequency feature information, and perform feature restoration on the high frequency feature information to obtain a restored high frequency signal.

A method for performing, by the decoder side, gain compensation on the high frequency prediction information according to the high frequency compensation information to obtain the high frequency feature information is opposite to a method for determining, by the encoder side, the high frequency compensation information of the to-be-coded high frequency signal according to the difference between the high frequency feature information and the high frequency prediction information. In addition, a method for performing feature restoration on high frequency feature information on the decoder side is opposite to a method for performing feature extraction on a to-be-coded high frequency signal on the encoder side.

Figure 11:
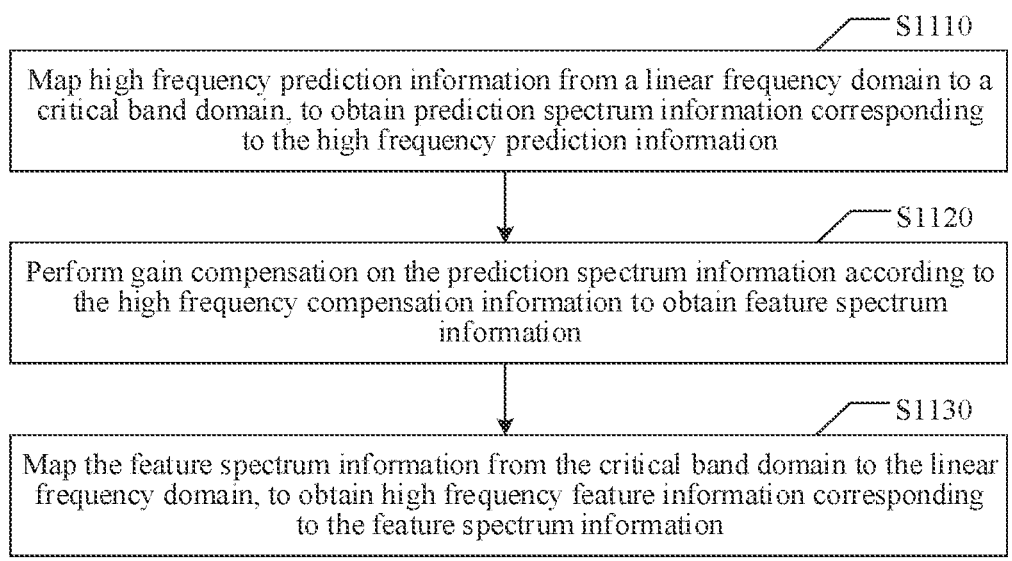
FIG. 11 is a schematic flowchart of steps of a method for obtaining high frequency feature information by means of gain compensation according to some embodiments of this application.

FIG. 11 is a schematic flowchart of steps of a method for obtaining high frequency feature information by means of gain compensation according to some embodiments of this application. As shown in FIG. 11, based on the foregoing embodiments, step S940 of performing gain compensation on the high frequency prediction information according to the high frequency compensation information to obtain the high frequency feature information may mainly include the following step S1110 to step S1130.

Step S1110. Map the high frequency prediction information from a linear frequency domain to a critical band domain, to obtain prediction spectrum information corresponding to the high frequency prediction information.

Step S1120. Perform gain compensation on the prediction spectrum information according to the high frequency compensation information to obtain feature spectrum information.

Step S1130. Map the feature spectrum information from a critical band domain to a linear frequency domain, to obtain high frequency feature information corresponding to the feature spectrum information.

To acquire feature information of a perception feature that conforms to an acoustic frequency of a human ear, and perform coding compression by using a relatively small quantity of sub-bands, an encoder side may perform mapping transform from the linear frequency domain to the critical band domain. Correspondingly, after a decoder side performs gain compensation on the prediction spectrum information by using the high frequency compensation information, the decoder side needs to map the obtained feature spectrum information from the critical band domain to the linear frequency domain, so as to obtain the high frequency feature information in the linear frequency domain, so that the high frequency feature information is restored in the linear frequency domain.

When the encoder side performs quantitative representation on the difference between the feature spectrum information and the prediction spectrum information, a logarithmic value obtained after logarithmic transform may be used for calculation. Correspondingly, in this embodiment of this application, when the decoder side performs gain compensation on the prediction spectrum information, logarithmic transform may be first performed on the prediction spectrum information to obtain the prediction spectrum logarithmic value, then gain compensation is performed on the prediction spectrum logarithmic value according to the high frequency compensation information to obtain the feature spectrum logarithmic value, and then exponential restoration is performed on the feature spectrum logarithmic value to obtain the feature spectrum information. The exponential restoration method and the logarithmic transform method are mutually inverse processes.

In step S940, after the high frequency feature information corresponding to the feature spectrum information is obtained by means of Bark domain transform, feature restoration may be performed on the high frequency feature information to obtain a restored high frequency signal. The encoder side may perform feature extraction on the to-be-coded high frequency signal in a compression transform manner, and correspondingly, the decoder side may perform feature restoration on the high frequency feature information by using decompression transform. For example, MDCT is used on the encoder side to perform feature extraction, and inverse modified discrete cosine transform (IMDCT) may be correspondingly used on the decoder side to perform feature restoration.

In step S950, perform sub-band synthesis on the restored low frequency signal and the restored high frequency signal to obtain a restored audio of the audio coded data.

Sub-band synthesis of the decoder side is an inverse process of sub-band decomposition on the encoder side, and is used for integrating signals of multiple different frequency bands into one complete frequency band. In some embodiments of this application, a quadrature mirror filter (QMF) including a low-pass filter corresponding to a low frequency band and a high-pass filter corresponding to a high frequency band may be obtained, and then sub-band synthesis is performed on a restored low frequency signal and a restored high frequency signal by using the quadrature mirror filter, to obtain a restored audio of audio coded data.

The QMF is formed by combining two or more filters by using a common input interface or a common output interface. In this embodiment of this application, the low-pass filter corresponding to the low frequency band and the high-pass filter corresponding to the high frequency band may form the quadrature mirror filter by using a common output interface, and after the restored low frequency signal is input to the low-pass filter and the restored high frequency signal is input to the high-pass filter, the restored audio in the complete frequency band output by the quadrature mirror filter may be obtained after sub-band synthesis.

Figure 12:
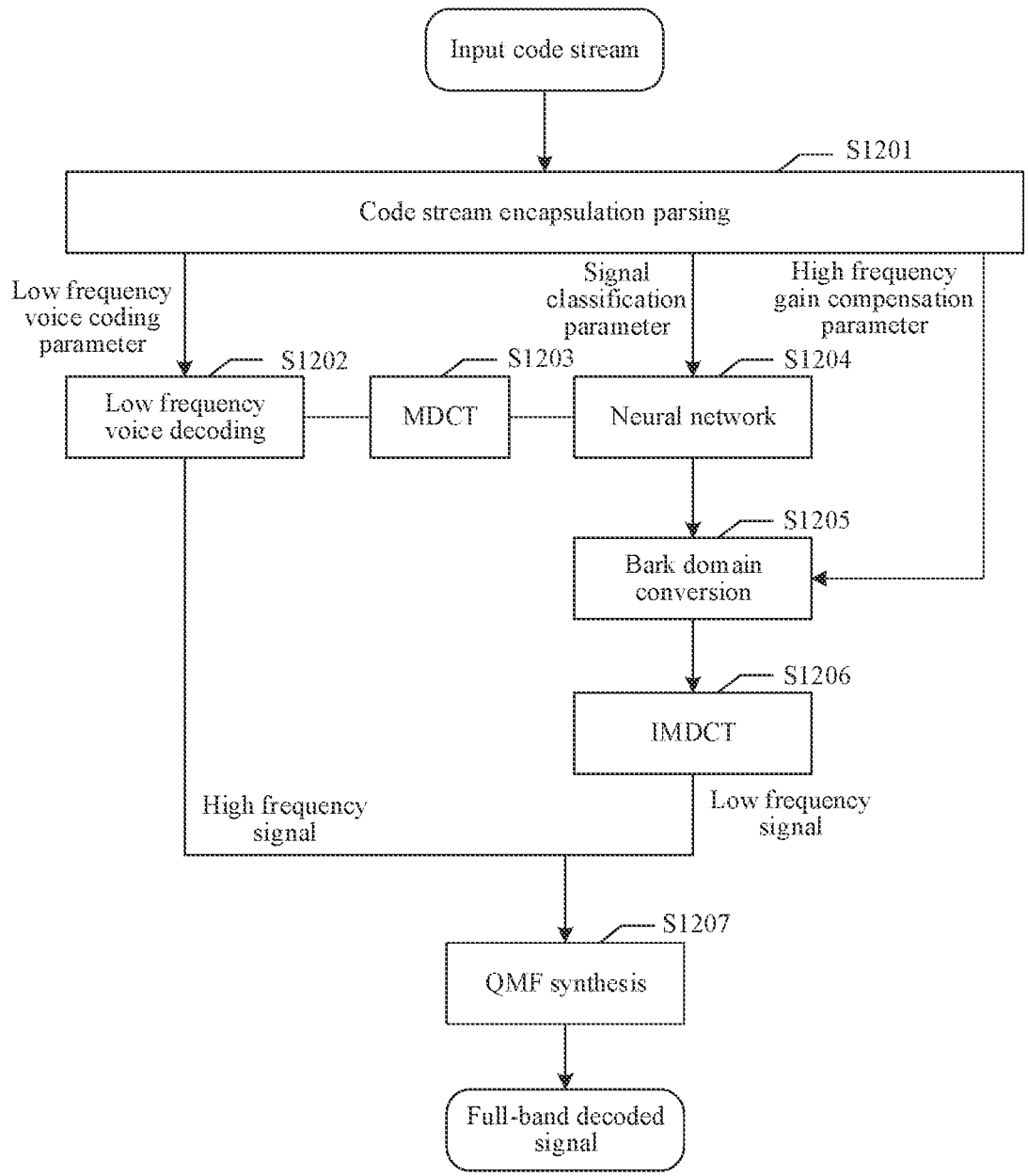
FIG. 12 is a schematic flowchart of a method for performing decoding processing on an input bitstream in an application scenario according to an embodiment of this application.

FIG. 12 is a schematic flowchart of a method for performing decoding processing on an input bitstream in an application scenario according to an embodiment of this application. As shown in FIG. 12, in this application scenario, the method for performing audio decoding on an input bitstream by a decoder side may mainly include the following step S1201 to step S1207.

Step S1201. Perform encapsulation parsing on a received input bitstream to obtain a low frequency voice coding parameter, a high frequency gain compensation parameter, and a signal classification parameter that are corresponding to each data frame. The signal classification parameter is used for reflecting a high frequency prediction neural network used by a current data frame.

Step S1202. A decoder corresponding to an encoder side performs decoding processing on the low frequency voice coding parameter obtained by means of encapsulation parsing in step S1201 to obtain a low frequency signal.

Step S1203. Perform MDCT on the low frequency signal to obtain low frequency spectrum information.

Step S1204. Input the low frequency spectrum information obtained by means of transform in step S1203 to the high frequency prediction neural network selected according to the signal classification parameter in step S1201, and the high frequency prediction neural network outputs predicted high frequency linear spectrum information.

Step S1205. Convert the high frequency linear spectrum information obtained in step S1204 into a Bark domain, perform Bark sub-band spectrum energy adjustment by using the high frequency gain compensation parameter obtained by encapsulation parsing in step S1201, and then convert the high frequency linear spectrum information into the linear domain by using the Bark domain to obtain high frequency spectrum information.

Step S1206. Perform IMDCT on the high frequency spectrum information obtained in step S1205 to obtain a reconstructed high frequency signal.

Step S1207. Combine the low frequency signal obtained in step S1202 and the high frequency signal obtained in step S1206 into a full-band decoded signal by using a QMF synthesis filter, and output the full-band decoded signal.

In the audio coding and decoding method provided in this embodiment of this application, a prediction capability of a high frequency signal is improved by using a neural network to predict an audio sub-band coding and decoding manner, so as to further compress a high frequency code bit rate. In addition, in this embodiment of this application, input signals may be classified, and different corresponding neural networks are used for different types. Therefore, the technical solution provided in this application is not only applicable to a harmonic structure signal, but also applicable to another type of signal, and high frequency signal prediction fitting of different input signals can be better implemented.

Although the steps of the method in this application are described in a specific order in the accompanying drawings, this does not require or imply that the steps have to be performed in the specific order, or all the steps shown have to be performed to achieve an expected result. Additionally or alternatively, some steps may be omitted, a plurality of steps are combined into one step, and/or one step is decomposed into a plurality of steps for execution, and the like.

The following describes an apparatus embodiment of this application, which may be configured to execute the audio coding method and the audio decoding method in the foregoing embodiment of this application.

Figure 13:
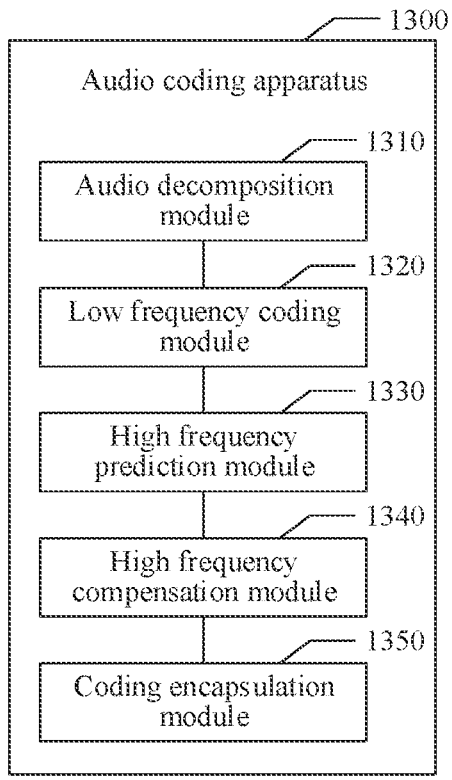
FIG. 13 is a schematic structural block diagram of an audio coding apparatus according to some embodiments of this application.

FIG. 13 is a schematic structural block diagram of an audio coding apparatus according to some embodiments of this application. As shown in FIG. 13, the audio coding apparatus 1300 may mainly include an audio decomposition module 1310, a low frequency coding module 1320, a high frequency prediction module 1330, a high frequency compensation module 1340, and a coding encapsulation module 1350.

The audio decomposition module 1310 is configured to perform sub-band decomposition on a to-be-coded audio to obtain a to-be-coded low frequency signal corresponding to a low frequency band and a to-be-coded high frequency signal corresponding to a high frequency band.

The low frequency coding module 1320 is configured to perform compression coding on the to-be-coded low frequency signal to obtain low frequency coded data of the to-be-coded low frequency signal.

The high frequency prediction module 1330 is configured to determine high frequency prediction information according to the to-be-coded low frequency signal based on correlation between a low frequency signal and a high frequency signal.

The high frequency compensation module 1340 is configured to perform feature extraction on the to-be-coded high frequency signal to obtain high frequency feature information of the to-be-coded high frequency signal; and determine high frequency compensation information of the to-be-coded high frequency signal according to a difference between the high frequency feature information and the high frequency prediction information.

The coding encapsulation module 1350 is configured to perform encapsulation processing on the low frequency coded data and the high frequency compensation information to obtain audio coded data of the to-be-coded audio.

In some embodiments of this application, based on the foregoing embodiments, the high frequency prediction module 1330 includes an audio classification unit, configured to perform classification processing on to-be-coded audio to obtain audio category information of the to-be-coded audio; a coding-end network acquiring unit, configured to: determine a high frequency prediction neural network corresponding to the audio category information, the high frequency prediction neural network being obtained through training based on the correlation between a low frequency signal and a high frequency signal; and a coding-end network mapping unit, configured to: perform mapping processing on the to-be-coded low frequency signal by using the high frequency prediction neural network, to obtain the high frequency prediction information.

In some embodiments of this application, based on the foregoing embodiments, the audio classification unit includes: a sample category annotation subunit, configured to: acquire an audio data sample, and perform frame-by-frame annotation on the audio data sample to obtain an audio category identifier of each data frame in the audio data sample; a sample feature extraction subunit, configured to: perform feature extraction on the audio data sample from multiple feature dimensions to obtain a multi-dimensional sample feature of the audio data sample; a classification network training subunit, configured to: use the multi-dimensional sample feature as an input value, use the audio category identifier as a target value corresponding to the input value, and obtain, by means of training, an audio classification neural network used for performing classification processing on audio data; and a classification network processing subunit, configured to: perform classification processing on the to-be-coded audio by using the audio classification neural network, to obtain the audio category information of the to-be-coded audio.

In some embodiments of this application, based on the foregoing embodiments, the coding-end network acquiring unit includes: a first sample transform subunit, configured to: acquire an audio data sample corresponding to the audio category information, and perform compression transform on the audio data sample to obtain a spectrum feature sample of the audio data sample; a first frequency band division subunit, configured to: divide the spectrum feature sample according to a value of a frequency point, to obtain a low frequency feature sample and a high frequency feature sample; and a first network acquiring subunit, configured to: train the high frequency prediction neural network by using the low frequency feature sample as an input value and the high frequency feature sample as a target value corresponding to the input value.

In some embodiments of this application, based on the foregoing embodiments, the coding-end network acquiring unit includes: a second frequency band division subunit, configured to: acquire an audio data sample corresponding to the audio category information, and decompose the audio data sample into a low frequency data sample and a high frequency data sample according to a frequency band in which the audio data sample is located; a second sample transform subunit, configured to: separately performing compression transform on the low frequency data sample and the high frequency data sample to obtain a corresponding low frequency feature sample and high frequency feature sample; and a second network acquiring subunit, configured to: train the high frequency prediction neural network by using the low frequency feature sample as an input value and the high frequency feature sample as a target value corresponding to the input value.

In some embodiments of this application, based on the foregoing embodiments, the coding-end network mapping unit includes a coding-end low frequency decoding subunit, configured to: perform decoding processing on the low frequency coded data to obtain a low frequency decoded signal corresponding to the to-be-coded low frequency signal; and a coding-end low frequency mapping subunit, configured to: perform mapping processing on the low frequency decoded signal by using the high frequency prediction neural network, to obtain the high frequency prediction information.

In some embodiments of this application, based on the foregoing embodiments, the coding-end low frequency mapping subunit includes: a coding-end compression transform subunit, configured to: perform compression transform on the low frequency decoded signal to obtain a low frequency spectrum feature of the low frequency decoded signal; and a coding-end feature mapping subunit, configured to, perform mapping processing on the low frequency spectrum feature by using the high frequency prediction neural network, to obtain the high frequency prediction information.

In some embodiments of this application, based on the foregoing embodiments, the audio decomposition module 1310 includes: a filter acquiring unit, configured to: acquire a quadrature mirror filter including a low-pass filter corresponding to the low frequency band and a high-pass filter corresponding to the high frequency band; and a sub-band decomposition unit, configured to perform sub-band decomposition on a to-be-coded audio by using the quadrature mirror filter, to obtain a to-be-coded low frequency signal corresponding to a low frequency band and a to-be-coded high frequency signal corresponding to a high frequency band.

In some embodiments of this application, based on the foregoing embodiments, the high frequency compensation module 1340 includes a high frequency compression transform unit, configured to: perform compression transform on the to-be-coded high frequency signal to obtain high frequency feature information of the to-be-coded high frequency signal.

In some embodiments of this application, based on the foregoing embodiments, the high frequency compensation module 1340 further includes a feature spectrum conversion unit, configured to: map the high frequency feature information from a linear frequency domain to a critical band domain, to obtain feature spectrum information corresponding to the high frequency feature information; a prediction spectrum conversion unit, configured to: map the high frequency prediction information from a linear frequency domain to a critical band domain, to obtain prediction spectrum information corresponding to the high frequency prediction information; and a compensation information determining unit, configured to: determine the high frequency compensation information of the to-be-coded high frequency signal according to a difference between the feature spectrum information and the prediction spectrum information.

In some embodiments of this application, based on the foregoing embodiments, the compensation information determining unit includes a first logarithmic transform subunit, configured to: separately perform logarithmic transform on the feature spectrum information and the prediction spectrum information to obtain a feature spectrum logarithmic value and a prediction spectrum logarithmic value; and again quantization subunit, configured to: query a gain code table according to a difference between the feature spectrum logarithmic value and the prediction spectrum logarithmic value, to obtain a gain quantization value, and determine the gain quantization value as the high frequency compensation information of the to-be-coded high frequency signal.

In some embodiments of this application, based on the foregoing embodiments, the coding encapsulation module 1350 includes a coding encapsulation unit, configured to: perform encapsulation processing on the audio category information, the low frequency coded data, and the high frequency compensation information, to obtain audio coded data of the to-be-coded audio.

Figure 14:
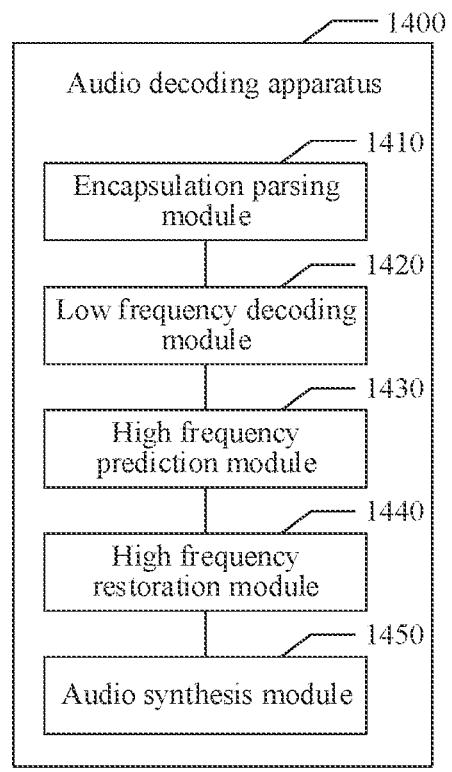
FIG. 14 is a schematic structural block diagram of an audio decoding apparatus according to some embodiments of this application.

FIG. 14 is a schematic structural block diagram of an audio decoding apparatus according to some embodiments of this application. As shown in FIG. 14, the audio decoding apparatus 1400 may mainly include an encapsulation parsing module 1410, a low frequency decoding module 1420, a high frequency prediction module 1430, a high frequency restoration module 1440, and an audio synthesis module 1450.

The encapsulation parsing module 1410 is configured to perform encapsulation parsing on to-be-decoded audio coded data to obtain low frequency coded data and high frequency compensation information in the audio coded data.

The low frequency decoding module 1420 is configured to perform decoding processing on the low frequency coded data to obtain a restored low frequency signal.

The high frequency prediction module 1430 is configured to determine high frequency prediction information according to the restored low frequency signal based on correlation between a low frequency signal and a high frequency signal.

The high frequency restoration module 1440 is configured to: perform gain compensation on the high frequency prediction information according to the high frequency compensation information to obtain high frequency feature information, and perform feature restoration on the high frequency feature information to obtain a restored high frequency signal.

The audio synthesis module 1450 is configured to perform sub-band synthesis on the restored low frequency signal and the restored high frequency signal to obtain a restored audio of the audio coded data.

In some embodiments of this application, based on the foregoing embodiments, the high frequency prediction module 1430 includes a category acquiring unit, configured to: perform encapsulation parsing on the audio coded data to obtain audio category information in the audio coded data; a decoding-end network acquiring unit, configured to: determine a high frequency prediction neural network corresponding to the audio category information, the high frequency prediction neural network being obtained through training based on the correlation between a low frequency signal and a high frequency signal; and a decoding-end network mapping unit, configured to: perform mapping processing on the restored low frequency signal by using the high frequency prediction neural network, to obtain the high frequency prediction information.

In some embodiments of this application, based on the foregoing embodiments, the decoding-end network acquiring unit includes: a first sample transform subunit, configured to: acquire an audio data sample corresponding to the audio category information, and perform compression transform on the audio data sample to obtain a spectrum feature sample of the audio data sample; a first frequency band division subunit, configured to: divide the spectrum feature sample according to a value of a frequency point, to obtain a low frequency feature sample and a high frequency feature sample; and a first network acquiring subunit, configured to: train the high frequency prediction neural network by using the low frequency feature sample as an input value and the high frequency feature sample as a target value corresponding to the input value.

In some embodiments of this application, based on the foregoing embodiments, the decoding-end network acquiring unit includes: a second frequency band division subunit, configured to: acquire an audio data sample corresponding to the audio category information, and decompose the audio data sample into a low frequency data sample and a high frequency data sample according to a frequency band in which the audio data sample is located; a second sample transform subunit, configured to: separately performing compression transform on the low frequency data sample and the high frequency data sample to obtain a corresponding low frequency feature sample and high frequency feature sample; and a second network acquiring subunit, configured to: train the high frequency prediction neural network by using the low frequency feature sample as an input value and the high frequency feature sample as a target value corresponding to the input value.

In some embodiments of this application, based on the foregoing embodiments, the decoding-end network mapping unit includes: a decoding-end compression transform subunit, configured to: perform compression transform on a restored low frequency signal to obtain a low frequency spectrum feature of the restored low frequency signal; and a decoding-end feature mapping subunit, configured to: perform mapping processing on the low frequency spectrum feature by using the high frequency prediction neural network, to obtain the high frequency prediction information.

In some embodiments of this application, based on the foregoing embodiments, the high frequency restoration module 1440 includes a spectrum information prediction unit, configured to: map the high frequency prediction information from a linear frequency domain to a critical band domain, to obtain prediction spectrum information corresponding to the high frequency prediction information; a spectrum information compensation unit, configured to: perform gain compensation on the prediction spectrum information according to the high frequency compensation information to obtain feature spectrum information; and a feature information determining unit, configured to: map the feature spectrum information from a critical band domain to a linear frequency domain, to obtain high frequency feature information corresponding to the feature spectrum information.

In some embodiments of this application, based on the foregoing embodiments, the spectrum information compensation unit includes a second logarithmic transform subunit, configured to: perform logarithmic transform on the prediction spectrum information to obtain a prediction spectrum logarithmic value; a logarithmic value compensation subunit, configured to: perform gain compensation on the prediction spectrum logarithmic value according to the high frequency compensation information to obtain a feature spectrum logarithmic value; and an exponential restoration subunit, configured to: perform exponential restoration on the feature spectrum logarithmic value to obtain the feature spectrum information.

In some embodiments of this application, based on the foregoing embodiments, the high frequency restoration module further includes: a feature information decompression unit, configured to: perform decompression transform on the high frequency feature information to obtain a restored high frequency signal.

In some embodiments of this application, based on the foregoing embodiments, the audio synthesis module 1450 includes: a filter acquiring unit, configured to: acquire a quadrature mirror filter including a low-pass filter corresponding to the low frequency band and a high-pass filter corresponding to the high frequency band; and a sub-band synthesis unit, configured to: perform sub-band synthesis on the restored low frequency signal and the restored high frequency signal by using the quadrature mirror filter, to obtain a restored audio of the audio coded data.

In some embodiments of this application, based on the foregoing embodiments, the encapsulation parsing module 1410 includes a bitstream searching unit, configured to: search for bitstream unit separation information in to-be-decoded audio coded data; a bitstream separation unit, configured to: separate a to-be-decoded bitstream unit from the audio coded data according to the found bitstream unit separation information; and a bitstream parsing unit, configured to: perform field parsing on the bitstream unit to obtain the low frequency coded data and the high frequency compensation information that are encapsulated in the bitstream unit.

Specific details of the audio coding apparatus and the audio decoding apparatus provided in the embodiments of this application have been described in detail in corresponding method embodiments. Details are not described herein again.

Figure 15:
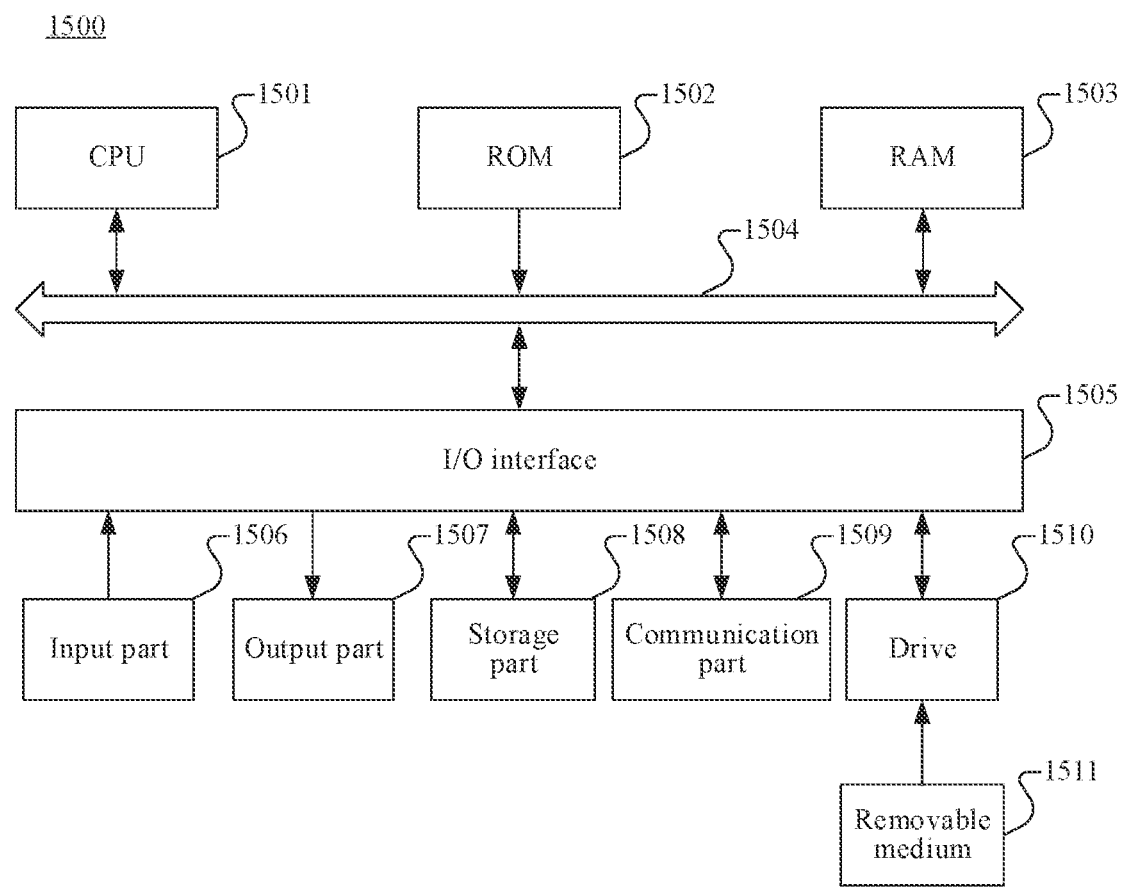
FIG. 15 is a schematic structural block diagram of a computer system applicable to an electronic device used for implementing an embodiment of this application.

FIG. 15 is a schematic block diagram of a computer system structure of an electronic device used for implementing an embodiment of this application.

The computer system 1500 of the electronic device shown in FIG. 15 is merely an example, and does not constitute any limitation on functions and use ranges of the embodiments of this application.

As shown in FIG. 15, the computer system 1500 includes a central processing unit (CPU) 1501. The CPU 1501 may perform various appropriate actions and processing according to a program stored in a read-only memory (ROM) 1502 or a program loaded from a storage portion 1508 into a random access memory (RAM) 1503. The RAM 1503 further stores various programs and data required for system operations. The CPU 1501, the ROM 1502, and the RAM 1503 are connected to each other through a bus 1504. An input/output (I/O) interface 1505 is also connected to the bus 1504.

The following components are connected to the I/O interface 1505 that includes an input part 1506 including a keyboard, a mouse, or the like; an output part 1507 including a cathode ray tube (CRT), a liquid crystal display (LCD), a speaker, or the like; a storage part 1508 including hard disk, or the like; and a communication part 1509 including a network interface card such as a local area network (LAN) card, a modem, or the like. The communication part 1509 performs communication processing by using a network such as the Internet. A drive 1510 is also connected to the I/O interface 1505 as required. A removable medium 1511, such as a magnetic disk, an optical disc, a magneto-optical disk, or a semiconductor memory, is installed on the driver 1510 as required, so that a computer program read from the removable medium is installed into the storage part 1508 as required.

In particular, according to the embodiments of this application, processes described in each method flowchart may be implemented as computer software programs. For example, an embodiment of this application includes a computer program product. The computer program product includes a computer program hosted on a computer-readable medium. The computer program includes program code for performing the method shown in the flowchart. In such an embodiment, by using the communication part 1509, the computer program may be downloaded and installed from a network, and/or installed from the removable medium 1511. When the computer program is executed by the CPU 1501, the various functions defined in the system of this application are executed.

The computer-readable medium shown in the embodiments of this application may be a computer-readable signal medium or a computer-readable storage medium or any combination of two. The computer-readable storage medium (e.g., non-transitory computer readable storage medium) may be, for example, but is not limited to, an electrical, magnetic, optical, electromagnetic, infrared, or semiconductor system, apparatus, or device, or any combination thereof. A more specific example of the computer-readable storage medium may include but is not limited to, an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs sub-band decomposition and/or frequency prediction. In practical application, the foregoing functions may be allocated to and completed by different functional modules according to requirements, that is, an inner structure of a device is divided into different functional modules to implement all or a part of the functions described above.

What is claimed is:

1. An audio coding method performed by an electronic device, the method comprising:
    performing sub-band decomposition on a to-be-coded audio to obtain: (i) a to-be-coded low frequency signal corresponding to a low frequency band and (ii) a to-be-coded high frequency signal corresponding to a high frequency band;
    performing compression coding on the to-be-coded low frequency signal to obtain low frequency coded data of the to-be-coded low frequency signal;
    determining high frequency prediction information according to the to-be-coded low frequency signal based on a correlation between a low frequency signal and a high frequency signal;
    performing feature extraction on the to-be-coded high frequency signal to obtain high frequency feature information of the to-be-coded high frequency signal;
    determining high frequency compensation information of the to-be-coded high frequency signal according to a difference between the high frequency feature information and the high frequency prediction information; and
    performing encapsulation processing on the low frequency coded data and the high frequency compensation information to obtain audio coded data of the to-be-coded audio.

2. The method according to claim 1, wherein determining the high frequency prediction information comprises:
    performing classification processing on the to-be-coded audio to obtain audio category information of the to-be-coded audio;
    determining a high frequency prediction neural network corresponding to the audio category information, wherein the high frequency prediction neural network is obtained through training based on the correlation between a low frequency signal and a high frequency signal; and
    performing mapping processing on the to-be-coded low frequency signal using the high frequency prediction neural network, to obtain the high frequency prediction information.

3. The method according to claim 2, wherein performing the classification processing on the to-be-coded audio comprises:
    acquiring an audio data sample;
    performing frame-by-frame annotation on the audio data sample to obtain an audio category identifier for each data frame in the audio data sample;
    performing feature extraction on the audio data sample from multiple feature dimensions to obtain a multi-dimensional sample feature of the audio data sample;
    using the multi-dimensional sample feature as an input value and using the audio category identifier as a target value corresponding to the input value, obtaining, by means of training, an audio classification neural network used for performing classification processing on audio data; and
    performing classification processing on the to-be-coded audio using the audio classification neural network, to obtain the audio category information of the to-be-coded audio.

4. The method according to claim 2, further comprising training the high frequency prediction neural network, the training including:
    acquiring an audio data sample corresponding to the audio category information;
    performing compression transform on the audio data sample to obtain a spectrum feature sample of the audio data sample;
    dividing the spectrum feature sample according to a value of a frequency point, to obtain a low frequency feature sample and a high frequency feature sample; and
    training the high frequency prediction neural network using the low frequency feature sample as an input value and the high frequency feature sample as a target value corresponding to the input value.

5. The method according to claim 2, further comprising training the high frequency prediction neural network, the training including:
    acquiring an audio data sample corresponding to the audio category information;
    decomposing the audio data sample into a low frequency data sample and a high frequency data sample according to a frequency band in which the audio data sample is located;
    separately performing compression transform on the low frequency data sample and the high frequency data sample to obtain a corresponding low frequency feature sample and high frequency feature sample; and
    training the high frequency prediction neural network by using the low frequency feature sample as an input value and the high frequency feature sample as a target value corresponding to the input value.

6. The method according to claim 2, wherein performing the mapping processing on the to-be-coded low frequency signal comprises:
    performing decoding processing on the low frequency coded data to obtain a low frequency decoded signal corresponding to the to-be-coded low frequency signal; and
    performing mapping processing on the low frequency decoded signal using the high frequency prediction neural network, to obtain the high frequency prediction information.

7. The method according to claim 6, wherein performing the mapping processing on the low frequency decoded signal comprises:
    performing compression transform on the low frequency decoded signal to obtain a low frequency spectrum feature of the low frequency decoded signal; and performing mapping processing on the low frequency spectrum feature using the high frequency prediction neural network to obtain the high frequency prediction information.

8. The method according to claim 1, wherein performing the sub-band decomposition on the to-be-coded audio comprises:
acquiring a quadrature mirror filter comprising a low-pass filter corresponding to the low frequency band and a high-pass filter corresponding to the high frequency band; and
performing sub-band decomposition on the to-be-coded audio using the quadrature mirror filter, to obtain the to-be-coded low frequency signal and the to-be-coded high frequency signal.

9. The method according to claim 1, wherein performing the feature extraction on the to-be-coded high frequency signal comprises:
performing compression transform on the to-be-coded high frequency signal to obtain the high frequency feature information of the to-be-coded high frequency signal.

10. The method according to claim 1, wherein determining the high frequency compensation information comprises:
mapping the high frequency feature information from a linear frequency domain to a critical band domain, to obtain feature spectrum information corresponding to the high frequency feature information;
mapping the high frequency prediction information from a linear frequency domain to a critical band domain, to obtain prediction spectrum information corresponding to the high frequency prediction information; and
determining the high frequency compensation information of the to-be-coded high frequency signal according to a difference between the feature spectrum information and the prediction spectrum information.

11. The method according to claim 10, wherein determining the high frequency compensation information of the to-be-coded high frequency signal comprises:
separately performing logarithmic transform on the feature spectrum information and the prediction spectrum information to obtain a feature spectrum logarithmic value and a prediction spectrum logarithmic value;
querying a gain code table according to a difference between the feature spectrum logarithmic value and the prediction spectrum logarithmic value, to obtain a gain quantization value, and
determining the gain quantization value as the high frequency compensation information of the to-be-coded high frequency signal.

12. The method according to claim 2, wherein performing the encapsulation processing on the low frequency coded data and the high frequency compensation information to obtain audio coded data of the to-be-coded audio comprises:
performing encapsulation processing on the audio category information, the low frequency coded data, and the high frequency compensation information to obtain the audio coded data of the to-be-coded audio.

13. An electronic device, comprising:
one or more processors, and
memory storing one or more programs, the one or more programs comprising instructions that, when executed by the one or more processors, cause the one or more processors to perform operations comprising:
performing sub-band decomposition on a to-be-coded audio to obtain; (i) a to-be-coded low frequency signal corresponding to a low frequency band and (ii) a to-be-coded high frequency signal corresponding to a high frequency band;
performing compression coding on the to-be-coded low frequency signal to obtain low frequency coded data of the to-be-coded low frequency signal;
determining high frequency prediction information according to the to-be-coded low frequency signal based on a correlation between a low frequency signal and a high frequency signal;
performing feature extraction on the to-be-coded high frequency signal to obtain high frequency feature information of the to-be-coded high frequency signal;
determining high frequency compensation information of the to-be-coded high frequency signal according to a difference between the high frequency feature information and the high frequency prediction information; and
performing encapsulation processing on the low frequency coded data and the high frequency compensation information to obtain audio coded data of the to-be-coded audio.

14. The electronic device according to claim 13, wherein determining the high frequency prediction information comprises;
performing classification processing on the to-be-coded audio to obtain audio category information of the to-be-coded audio;
determining a high frequency prediction neural network corresponding to the audio category information, wherein the high frequency prediction neural network is obtained through training based on the correlation between a low frequency signal and a high frequency signal; and
performing mapping processing on the to-be-coded low frequency signal using the high frequency prediction neural network, to obtain the high frequency prediction information.

15. The electronic device according to claim 14, wherein performing the classification processing on the to-be-coded audio comprises:
acquiring an audio data sample;
performing frame-by-frame annotation on the audio data sample to obtain an audio category identifier for each data frame in the audio data sample;
performing feature extraction on the audio data sample from multiple feature dimensions to obtain a multi-dimensional sample feature of the audio data sample;
using the multi-dimensional sample feature as an input value and using the audio category identifier as a target value corresponding to the input value, obtaining, by means of training, an audio classification neural network used for performing classification processing on audio data; and
performing classification processing on the to-be-coded audio using the audio classification neural network, to obtain the audio category information of the to-be-coded audio.

16. The electronic device according to claim 14, wherein the operations further comprise training the high frequency prediction neural network, the training including:
acquiring an audio data sample corresponding to the audio category information;
performing compression transform on the audio data sample to obtain a spectrum feature sample of the audio data sample;

dividing the spectrum feature sample according to a value of a frequency point, to obtain a low frequency feature sample and a high frequency feature sample; and training the high frequency prediction neural network using the low frequency feature sample as an input value and the high frequency feature sample as a target value corresponding to the input value.

17. The electronic device according to claim 14, wherein the operations further comprise training the high frequency prediction neural network, the training including:

acquiring an audio data sample corresponding to the audio category information;

decomposing the audio data sample into a low frequency data sample and a high frequency data sample according to a frequency band in which the audio data sample is located;

separately performing compression transform on the low frequency data sample and the high frequency data sample to obtain a corresponding low frequency feature sample and high frequency feature sample; and training the high frequency prediction neural network by using the low frequency feature sample as an input value and the high frequency feature sample as a target value corresponding to the input value.

18. A non-transitory computer-readable storage medium, storing a computer program, the computer program, when executed by one or more processors of an electronic device, cause the one or more processors to perform operations comprising:

performing sub-band decomposition on a to-be-coded audio to obtain: (i) a to-be-coded low frequency signal corresponding to a low frequency band and (ii) a to-be-coded high frequency signal corresponding to a high frequency band;

performing compression coding on the to-be-coded low frequency signal to obtain low frequency coded data of the to-be-coded low frequency signal;

determining high frequency prediction information according to the to-be-coded low frequency signal based on a correlation between a low frequency signal and a high frequency signal;

performing feature extraction on the to-be-coded high frequency signal to obtain high frequency feature information of the to-be-coded high frequency signal;

determining high frequency compensation information of the to-be-coded high frequency signal according to a difference between the high frequency feature information and the high frequency prediction information; and performing encapsulation processing on the low frequency coded data and the high frequency compensation information to obtain audio coded data of the to-be-coded audio.

19. The non-transitory computer-readable storage medium according to claim 18, wherein performing the sub-band decomposition on the to-be-coded audio comprises:

acquiring a quadrature mirror filter comprising a low-pass filter corresponding to the low frequency band and a high-pass filter corresponding to the high frequency band; and performing sub-band decomposition on the to-be-coded audio using the quadrature mirror filter, to obtain the to-be-coded low frequency signal and the to-be-coded high frequency signal.

20. The non-transitory computer-readable storage medium according to claim 18, wherein determining the high frequency compensation information comprises:

mapping the high frequency feature information from a linear frequency domain to a critical band domain, to obtain feature spectrum information corresponding to the high frequency feature information;

mapping the high frequency prediction information from a linear frequency domain to a critical band domain, to obtain prediction spectrum information corresponding to the high frequency prediction information; and determining the high frequency compensation information of the to-be-coded high frequency signal according to a difference between the feature spectrum information and the prediction spectrum information.

* * * * *